US011663892B2

(12) United States Patent
Obukhov et al.

(10) Patent No.: US 11,663,892 B2
(45) Date of Patent: May 30, 2023

(54) CLOUD-BASED VIDEO MONITORING

(71) Applicant: Ubiquiti Networks, Inc., San Jose, CA (US)

(72) Inventors: Anton N. Obukhov, Moscow (RU); Huan T. Vu, Oxnard, CA (US); Jude Lee, Fremont, CA (US); Chung-Ming Lo, Hsinchu (TW); Robert J. Pera, San Jose, CA (US)

(73) Assignee: Ubiquiti Inc., New York, NY (US)

( * ) Notice: Subject to any disclaimer, the term of this patent is extended or adjusted under 35 U.S.C. 154(b) by 685 days.

(21) Appl. No.: 15/644,369

(22) Filed: Jul. 7, 2017

(65) Prior Publication Data

US 2017/0309145 A1 Oct. 26, 2017

Related U.S. Application Data

(63) Continuation of application No. 14/508,975, filed on Oct. 7, 2014, now Pat. No. 9,734,681.

(60) Provisional application No. 61/982,250, filed on Apr. 21, 2014, provisional application No. 61/887,896, filed on Oct. 7, 2013.

(51) Int. Cl.
*G08B 13/196* (2006.01)
*H04N 5/77* (2006.01)

(52) U.S. Cl.
CPC ......... *G08B 13/19656* (2013.01); *H04N 5/77* (2013.01); *G08B 13/19619* (2013.01)

(58) Field of Classification Search
USPC ................. 386/228, 226, 223–224
See application file for complete search history.

(56) References Cited

U.S. PATENT DOCUMENTS

| 7,365,871 | B2 | 4/2008 | Monroe |
| 8,970,703 | B1 | 3/2015 | Thomas, II et al. |
| 9,035,768 | B2* | 5/2015 | Leblond ................ H04N 7/181 340/541 |
| 2004/0080627 | A1 | 4/2004 | Kroll et al. |
| 2008/0068459 | A1* | 3/2008 | Wong .................... G08B 13/19 348/143 |
| 2009/0189981 | A1 | 7/2009 | Siann et al. |
| 2010/0135643 | A1* | 6/2010 | Fleming ............... G11B 27/034 386/224 |
| 2011/0074570 | A1 | 3/2011 | Feldstein et al. |
| 2012/0105632 | A1 | 5/2012 | Renkis |

(Continued)

FOREIGN PATENT DOCUMENTS

CN 102231821 A 11/2011

*Primary Examiner* — Helen Shibru
(74) *Attorney, Agent, or Firm* — Shun Yao; Yao Legal Services, Inc.

(57) ABSTRACT

One embodiment of the present invention provides a cloud-based video monitoring system comprising a camera and a network video recorder (NVR). During operation, the camera stores in a buffer last predetermined temporal segment of a video. The camera also stores a first video file in a local storage corresponding to an event detected by the camera. This first video file is non-overlapping with a second video file corresponding to the event and this second video file is stored in the NVR. The camera generates a third video file by pre-pending last predetermined temporal segment of a video prior to the event to the first video file and sends the third video file to the NVR.

10 Claims, 24 Drawing Sheets

(56) References Cited

U.S. PATENT DOCUMENTS

| | | | |
|---|---|---|---|
| 2014/0071290 A1* | 3/2014 | Collen | H04N 9/79 348/159 |
| 2014/0076969 A1* | 3/2014 | Marshall Chesney | G07C 9/00103 235/382 |
| 2014/0085480 A1* | 3/2014 | Saptharishi | G06F 16/71 348/159 |
| 2016/0286156 A1 | 9/2016 | Kovac | |
| 2016/0335070 A1 | 11/2016 | Aw et al. | |
| 2017/0116676 A1 | 4/2017 | Blessman et al. | |

\* cited by examiner

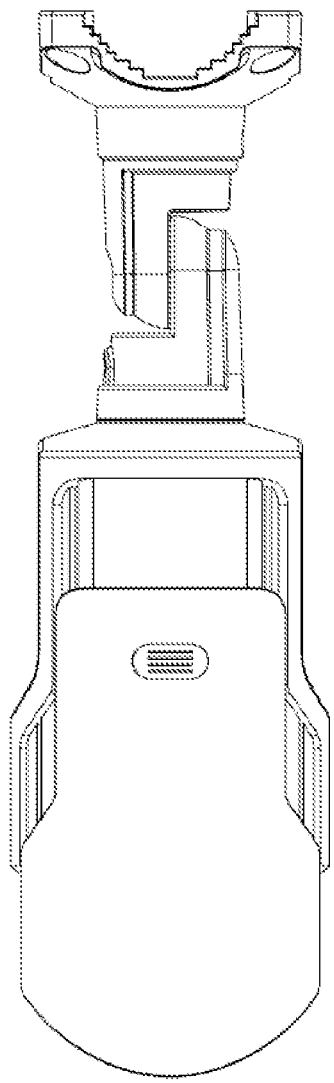
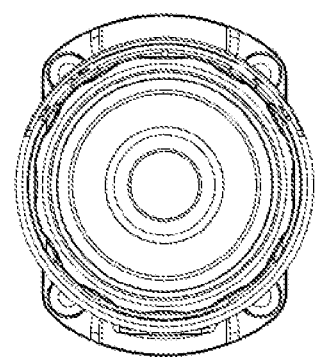
FIG. 8F
FIG. 8E
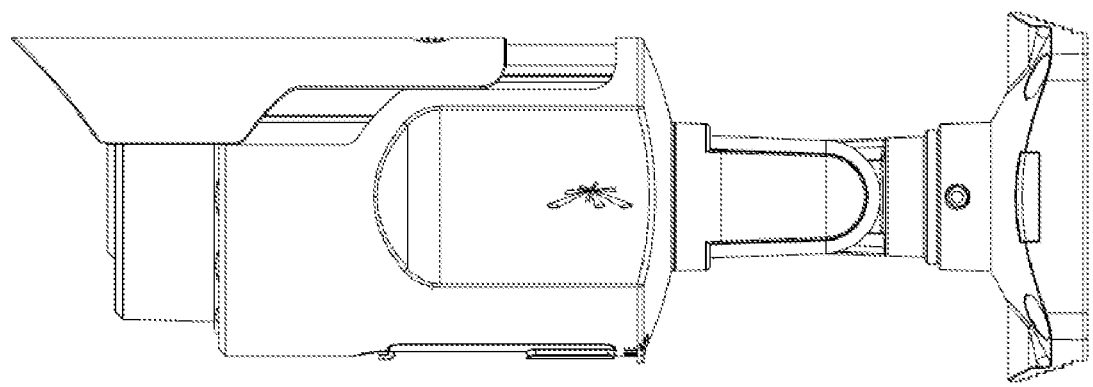
FIG. 8G

CLOUD-BASED VIDEO MONITORING

RELATED APPLICATION

This application is a continuation of application Ser. No. 14/508,975, titled "Cloud-Based Video Monitoring," by inventors Anton N. Obukhov, Huan T. Vu, Jude Lee, Chung-Ming Lo, AND Robert J. Pera, filed 7 Oct. 2014, which claims the benefit of U.S. Provisional Application No. 61/887,896, entitled "Cloud-based Video Monitoring," by inventors Anton N. Obukhov, Huan T. Vu, Jude Lee, Chung-Ming Lo, and Robert J. Pera, filed 7 Oct. 2013, and U.S. Provisional Application No. 61/982,250, entitled "Cloud-based Video Monitoring," by inventors Anton N. Obukhov, Huan T. Vu, Jude Lee, Chung-Ming Lo, and Robert J. Pera, filed 21 Apr. 2014.

BACKGROUND

Field

This disclosure is generally related to video monitoring. More specifically, this disclosure is related to a method and system for facilitating bandwidth efficient and scalable video monitoring via a network.

Related Art

In recent years, the phenomenal growth of cloud service has resulted in a huge demand in networked devices. Particularly, video monitoring services, such as video surveillance, which are often based on connectivity to a video recorder, are becoming increasingly dependent on the cloud. In a typical video monitoring system, one or more cameras stream videos to a centralized recorder for recording the video stream. If a video recorder is coupled to the cameras via a network interface (e.g., Ethernet), the recorder is referred to as a network video recorder (NVR).

In a small deployment, such as a home monitoring system, deploying such an NVR is non-trivial and costly. As a result, an NVR can reside in the cloud and the cameras deployed in a home can communicate with the NVR via the Internet to facilitate recording support to the cameras. One challenge is how to provide recording support from a cloud via a network connection, whose bandwidth is shared among many other devices, without a local NVR while providing a user with the flexibility to utilize the recorded video in a useful and desired way. In many cases, a video may not include any relevant event in its entire duration. Continuously streaming such a video feed can drain the bandwidth of a network without providing any useful information to the user.

Furthermore, some users may require full recording of a video while some other users may only require video recording associated with a specific event (e.g., detection of a motion) from a full recording. As a result, a video monitoring system often maintains a full recording and an additional event-triggered recording of the video associated with the desired event. This can lead to inefficient usage of network bandwidth and storage capabilities.

Additionally, the user may wish to use a video recording for specific purposes (e.g., neighborhood security). However, typically a user is required to extract the corresponding video recording and separately use the video recording. Video monitoring systems often do not provide integrated platform for utilizing the recorded videos for typical use cases.

SUMMARY

One embodiment of the present invention provides a cloud-based video monitoring system comprising a camera and a network video recorder (NVR). During operation, the digital video camera can store, in a buffer, a last predetermined temporal segment of a video stream. Then, if the digital video camera detects a triggering event, the digital video camera generating a pre-event video file comprising at least the last temporal segment of the video stream prior to the triggering event. The digital video camera sends the pre-event video file to a network video recorder (NVR) that is storing segments of the video stream after the triggering event.

In some embodiments, while generating the pre-event video file, the digital video camera can store the video stream to a first video file in a primary video repository. The digital video camera also initiates transmitting the video stream to the NVR that stores the segments of the video stream after the triggering event in a second video file. The digital video camera determines an earliest frame of the second video file stored by the NVR, and also determines, from the first video file, a latest frame which precedes the earliest frame of the second video file.

The digital video camera then generates the pre-event video file by pre-pending the last predetermined temporal segment of the video stream prior to the event to a portion of the first video file ending at the latest frame The pre-event video file is non-overlapping with the second video file stored by the NVR.

In some variations to these embodiments, while determining the earliest frame of the second video file, the digital video camera can receive, from the NVR, metadata associated with the earliest frame of the second video file.

In some variations to these embodiments, the digital video camera can maintain a persistent data connection with the NVR. Also, while sending the video stream to the NVR, the digital video camera transmits the video stream via the persistent connection in response to detecting the event.

In some variations to these embodiments, the digital video camera can detect the end of the triggering event, and terminates the transmitting of the video stream to the NVR.

In some embodiments, the digital video camera can detect an unavailability of the NVR. Then, in response to detecting the unavailability, the digital video camera can select a backup NVR for storing the video stream, and establishes a persistent connection with the NVR.

In some variations to these embodiments, the backup NVR includes one or more of: an NVR at a remote local area network; a remote computer cluster comprising one or more distributed NVRs; and a peer digital video camera.

In some variations to these embodiments, the digital video camera can transmit a copy of a locally stored video file to the backup NVR via the persistent connection.

In some embodiments, if the digital video camera detects an unavailability of the NVR, the digital video camera can search for a nearby peer digital video camera via a wireless communication interface. Also, in response to detecting a peer digital video camera, the local digital video camera can establish a wireless connection with the peer digital video camera over the wireless communication interface, and sends the video segments to the peer digital video camera over the wireless connection.

In some embodiments, if the digital video camera detects a power failure, the digital video camera initiates operating under a local power source and in a power-saving mode.

In some embodiments the digital video camera is paired with a wall input outlet. If the digital video camera detects a user of the wall input outlet, the digital video camera controls operation of the wall input outlet.

In some embodiments, while storing a respective video file, the digital video camera stores the individual video segments of the respective video file, in association with the respective video file.

In some variations to these embodiments, an overlapping segment of two video files is stored once, and in association with the two video files.

In some embodiments, the digital video camera comprises a printed circuit board (PCB) chassis comprising a PCB chamber with an opening at one end. The PCB chassis comprises a back seal along a perimeter of the opening of the PCB chassis, and the digital video camera comprises a front seal which, when coupled to the back seal of the PCB chassis, encapsulates the lens segment and seals the PCB chamber.

In some embodiments, wherein the PCB is installed along a top surface of the PCB chamber.

In some embodiments, the digital video camera comprises a camera chassis which encapsulates the PCB chassis.

In some variations to these embodiments, the camera chassis comprises a retractable weather guard.

In some variations to these embodiments, the front seal further comprises a plurality of drain channels equally spaced along an outer perimeter of the front seal. Also, when the front seal is coupled to the back seal, the plurality of drain channels produce drain holes which allow water to drain toward the back of the camera chassis.

In some embodiments, the digital video camera comprises a mounting apparatus coupled to the camera chassis. The mounting apparatus includes mount support for a flat surface and a curved surface.

In some embodiments, the digital video camera is a dome camera, and comprises a mounting apparatus which is screwed on to a ceiling mount.

One embodiment of the present invention provides a network video recorder (NVR) in a cloud-based video-monitoring system. During operation, the video-monitoring system can store, in a video repository, a first video file corresponding to a triggering event. The video-monitoring system determines metadata of an initial frame of the first video file, and sends the metadata to the digital video camera. The video-monitoring system then receives a pre-event video file from the camera. The pre-event video file corresponds to the trigger event and is non-overlapping with the first video file.

In some embodiments, the video-monitoring system comprises a plurality of distributed NVRs.

In some embodiments, the video-monitoring system receives video files from digital video cameras deployed across multiple sites, and wherein a respective video file is associated with a corresponding triggering event.

In some embodiments, when the video-monitoring system receives the first video file, the video-monitoring system determines a triggering event associated with the first video file. The video-monitoring system also determines a subscriber entity which has subscribed to the triggering event, and sends, to the subscriber entity, an alert which includes information related to the triggering event.

In some variations to these embodiments, the first video file corresponds to a first site, and the subscriber entity is associated with a second site.

In some variations to these embodiments, digital video cameras of the first site and the second site are controlled by the same entity.

In some variations to these embodiments, digital video cameras of the first site are controlled by a different entity than digital video cameras of the second site.

In some embodiments, the video-monitoring system transmits a video file stored in a remote NVR to a user.

In some embodiments, the video-monitoring system stores a video file recorded by a remote NVR in the local video repository.

In some embodiments, the video-monitoring system stores a video stream from a digital video camera across a plurality of NVRs and digital video cameras.

In some variations to these embodiments, if the video-monitoring system detects unavailability of a digital video camera or an NVR associated with the stored video stream, the video-monitoring system can recover individual segments of the stored video stream from the remainder of the plurality of NVRs and digital video cameras. The video-monitoring system then generates a recovered video file from the recovered individual segments of the stored video stream.

In some embodiments, the video-monitoring system can receive a request for the first video stream from a video server, and determines whether to stream obfuscated video to a video server based license of the video server. If the video-monitoring system determines that the video server is to receive an obfuscated video, the video-monitoring system obfuscates the first video stream, and sends the obfuscated video stream to the video server.

BRIEF DESCRIPTION OF THE FIGURES

FIG. 8E presents a top view of the camera illustrated in FIG. 8A, in accordance with one embodiment of the present invention.

FIG. 8F presents a front view of the camera illustrated in FIG. 8A, in accordance with one embodiment of the present invention.

FIG. 8G presents a side view of the camera illustrated in FIG. 8A, in accordance with one embodiment of the present invention.

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Embodiments of the present invention solve the problem of recording of video with arbitrarily length and type by facilitating distributed video recording and synchronization by a camera and a network video recorder (NVR) to produce a video. In particular, when a video recording is only required for specific events (e.g., a motion detection), distributed recording allows arbitrarily long motion event recordings, without using bandwidth between a camera and an NVR when there is no motion. In some embodiments, a video can be stored in a small granularity (e.g., segment-level granularity). These small video files can be combined to produce both full and event-triggered video recordings, without requiring storing multiple video files for different recording types.

In some embodiments, after obtaining such a video, a user can utilize an integrated utility system to use the video for any supported activity (e.g., social networking and neighborhood watch). Additionally, a respective camera can have its own storage, wired and wireless communication channels, and/or power source (e.g., a battery), and can operate as a backup for other nearby cameras. As a result, a group of cameras provide high availability against failure, theft, and destruction.

Figure 1A:
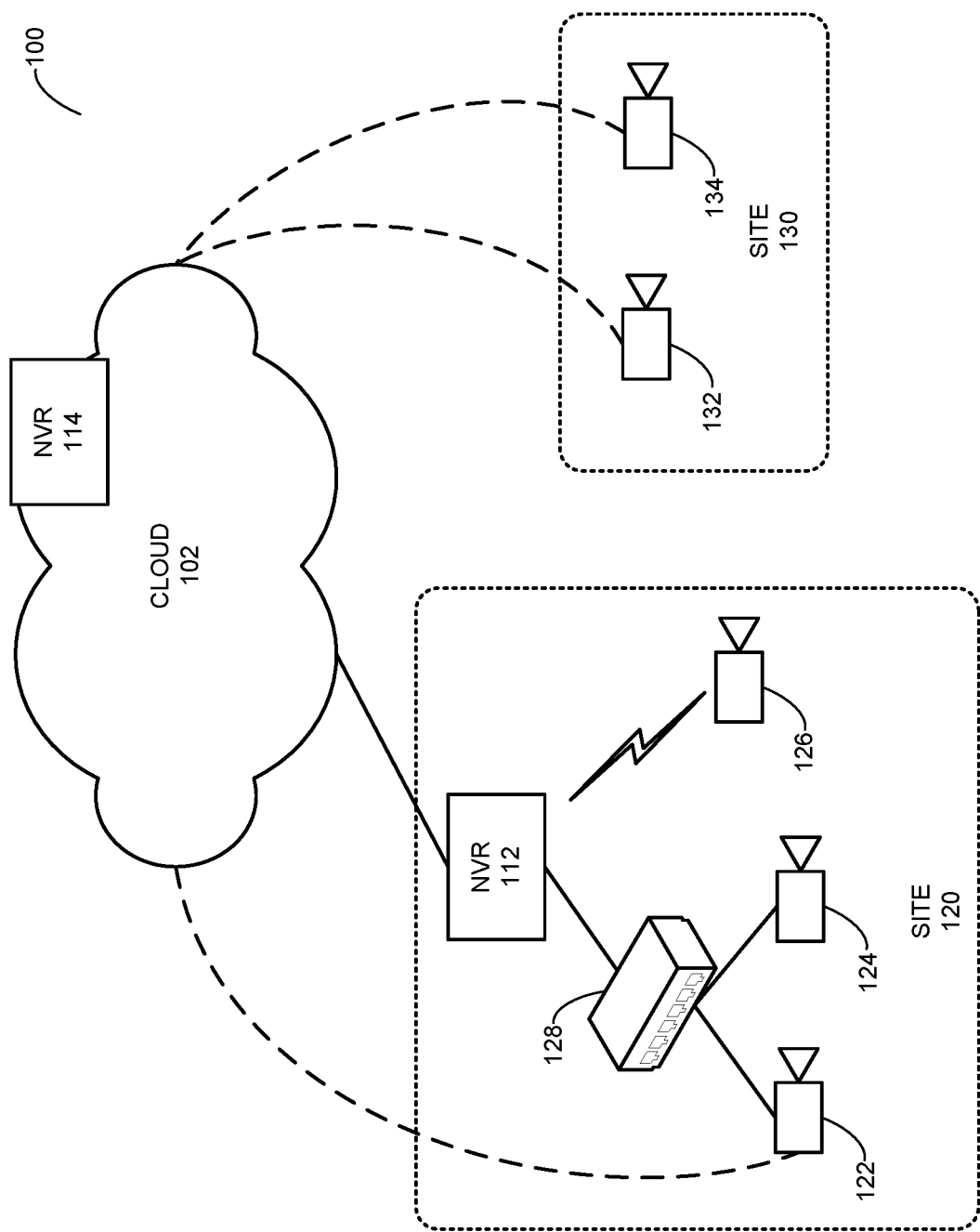
FIG. 1A illustrates an exemplary cloud-based video monitoring system, in accordance with one embodiment of the present invention.

FIG. 1A illustrates an exemplary cloud-based video monitoring system, in accordance with one embodiment of the present invention. In this example, a video monitoring system 100 is deployed in sites 120 and 130. In site 120, an NVR 11 is coupled to cloud 102 via one or more links. Cameras 122 and 124 are coupled to an NVR 112 via one or more links and a switch 128. The term "switch" has been used in a generic sense and can refer to any device capable of forwarding frames/packets in a network. Camera 126 is coupled to NVR via a wireless connection. Hence, NVR 112 can provide recording support via both wired and wireless connections. NVR 112 records the video feeds from cameras 122, 124, and 126 in one or more supported formats in a local mass storage device.

In some embodiments, cameras 122, 124, and 126 include a local storage (e.g., a hard drive, a flash drive, and/or secure digital (SD) card). Video recorded by these cameras can be stored in their respective local storages. Cameras 122, 124, and 126 can continuously record video or record video in response to an event in the respective local storages. Cameras 122, 124, and 126 also can continuously stream video feeds to NVR 112, stream video feeds to NVR 112 in response to an event, or continuously stream low-resolution video feed to NVR 112 and stream high-resolution video feed to NVR 112 in response to an event. In some embodiments, cameras 122, 124, and 126 upload locally recorded videos to NVR 112 opportunistically. For example, camera 122 can monitor the available bandwidth, latency, contention, or any other network parameter to determine when the locally recorded video should be uploaded to NVR 112.

In some embodiments, camera 122 can always record the last x seconds (e.g., 10 seconds) in a rolling buffer. Camera 122 can accumulate video from the rolling buffer to a local storage. In response to an event, camera 122 initiates the distributed recording. During the distributed recording process, camera 122 starts recording video in local storage and starts streaming the video feed to NVR 112. Upon receiving the first frame of the video feed, NVR 112 starts recording the video feed and notifies camera 122 of the first frame which NVR 112 has recorded. Camera 122 then receives the notification, generates a video file comprising video recordings till the first frame recorded by NVR 112, pre-pads the last x seconds of recorded video from the rolling buffer to the video file, and transmits the video file to NVR 112.

In some embodiments, camera 122 can also have a connection with cloud 102. Camera 122 can either establish this connection with cloud 102 in addition to the connection to switch 128 or in response to unavailability of NVR 112. Camera 122 is coupled to cloud 102 via one or more links and the video feed from camera 122 can be recorded in an NVR 114 in cloud 102. In site 130, cameras 132 and 134 are coupled to cloud 102 via one or more links (wired and/or wireless) and switches. In some embodiments, system 100 can maintain an NVR (e.g., NVR 114) in cloud 102 to record video feed streamed by cameras 132 and 134 in one or more supported formats. In this way, cameras can be deployed at a site without a local NVR.

Figure 1B:
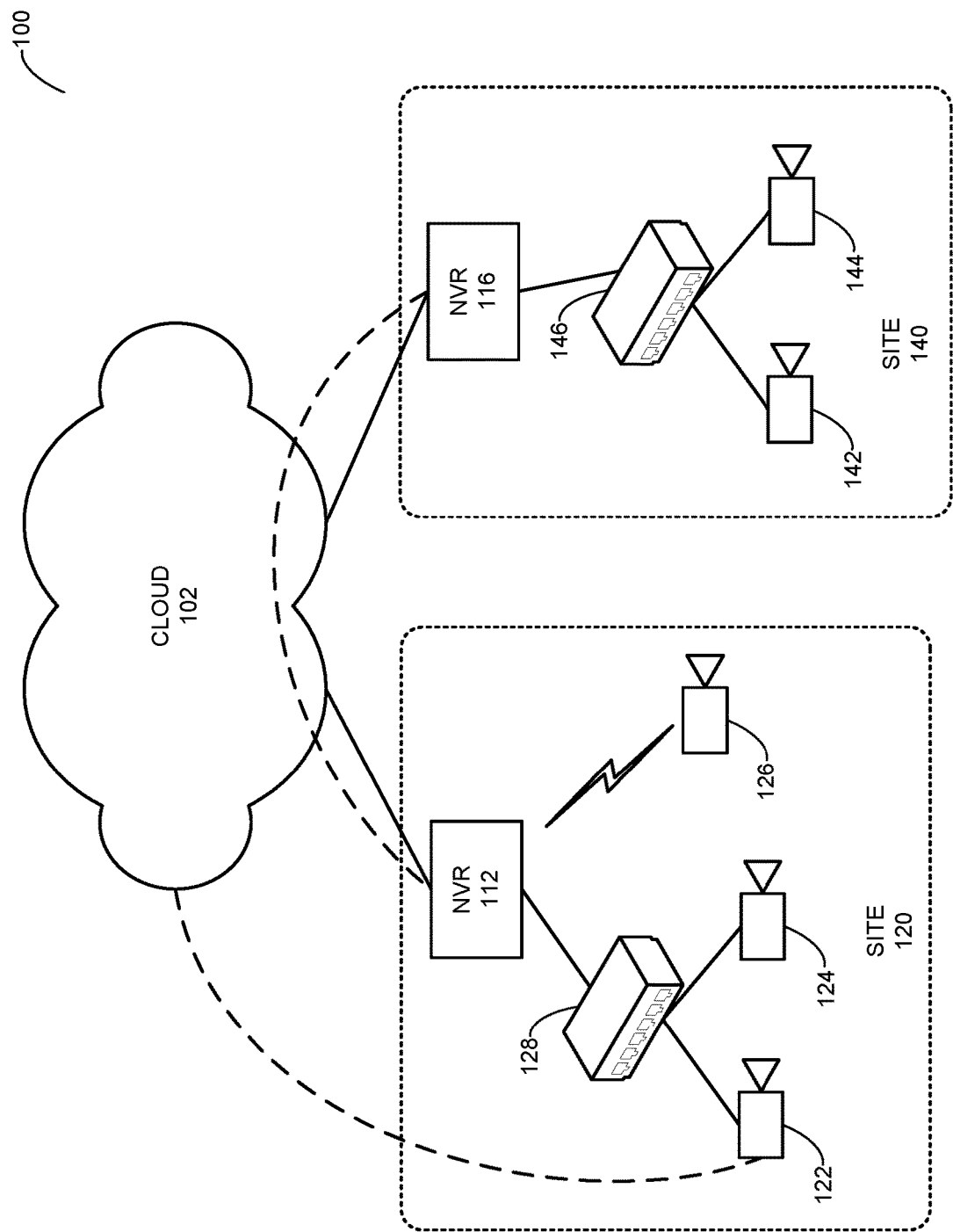
FIG. 1B illustrates an exemplary cloud-based video monitoring system spanning a plurality of user sites, in accordance with one embodiment of the present invention.

FIG. 1B illustrates an exemplary cloud-based video monitoring system spanning a plurality of user sites, in accordance with one embodiment of the present invention. In this example, system 100 is further deployed in site 140. Sites 120 and 140 can be owned/managed by the same entity. In site 140, cameras 142 and 144 are coupled to an NVR 116 via one or more links and switch 146. In some embodiments, NVRs 112 and 116 can be configured to operate in a master-slave mode. For example, NVR 112 can be configured as the master NVR. Video feeds from cameras 142 and 144 can be recorded in NVR 116. However, NVR 112 can access and stream videos recorded in NVR 116. In this way, a user in site 120 can obtain video recorded in a remote NVR (e.g., NVR 116) via a local NVR (e.g., NVR 112). In some embodiments, NVRs 112 and 116 can duplicate each others' recordings and can operate as backups of each other.

Figure 2A:
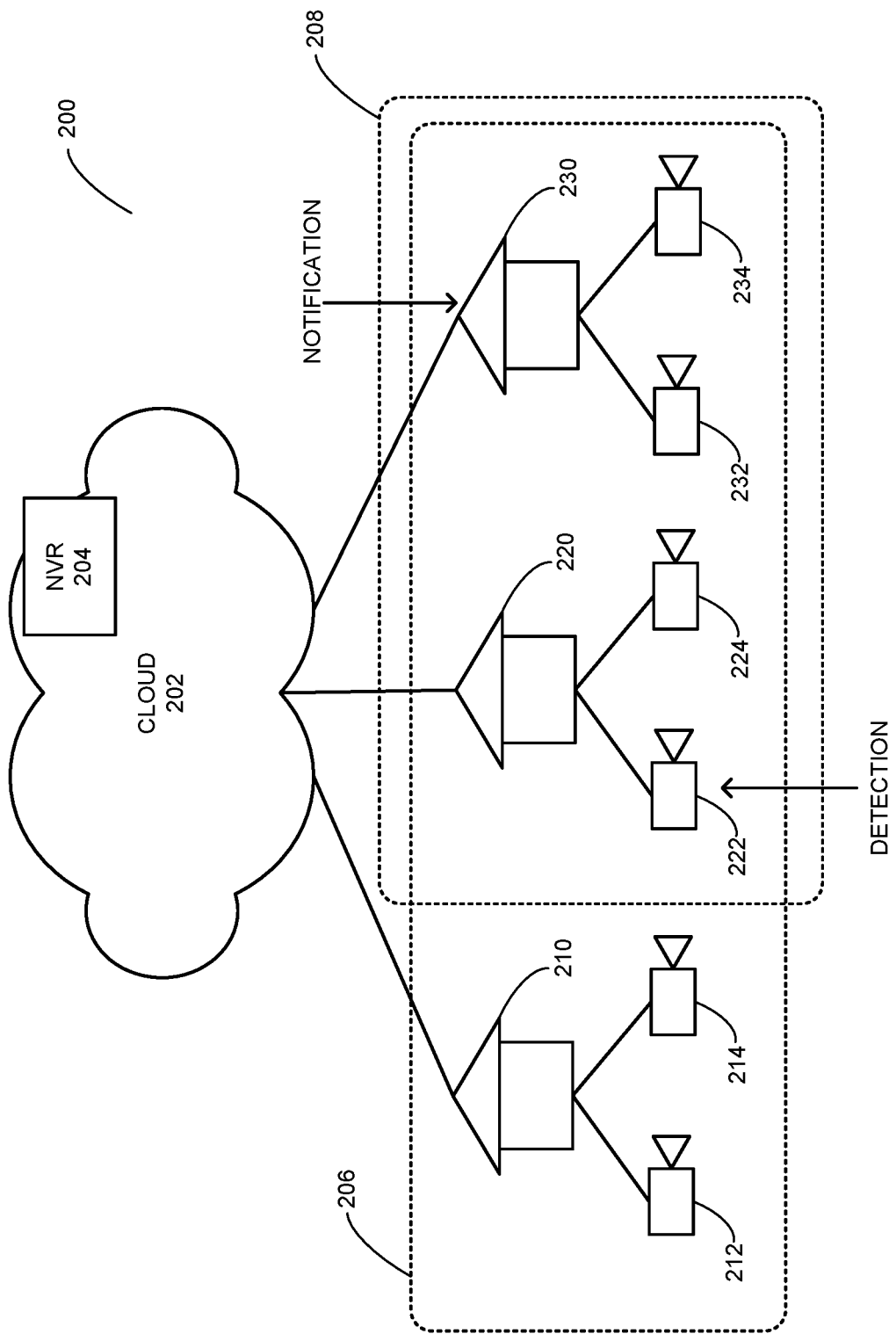
FIG. 2A illustrates an exemplary cloud-based video monitoring system with event notification support, in accordance with one embodiment of the present invention.

FIG. 2A illustrates an exemplary cloud-based video monitoring system with event notification support, in accordance with one embodiment of the present invention. In this example, a video monitoring system 200 is deployed in a neighborhood 206 comprising residences 210, 220, and 230. Cameras 212 and 214 are deployed in residence 210, cameras 222 and 224 are deployed in residence 220, and cameras 232 and 234 are deployed in residence 230. A respective camera of system 200 is coupled to cloud 202 via one or more links. The video feed from a respective camera of system 200 can be recorded in an NVR 204 in cloud 202.

In some embodiments, system 200 facilitates event detection. Examples of an event include, but are not limited to, motion detection, facial recognition (e.g., identifying a suspicious person), license plate detection (e.g., identifying a suspicious license plate), and possession detection (e.g., identifying a bag belonging to a user). Whenever a camera in neighborhood 206 detects an event, system 200 receives the event information. In some embodiments, NVR 204 can detect the event based on a video feed from the camera.

A user in neighborhood 206 can sign-up with system 200 to receive an alert if an event is triggered by providing one or more modes of contact to system 200. Examples of a mode of contact include, but are not limited to, a phone call, text message, e-mail, chat message, and interation in social media. In some embodiments, the user can provide the address of the residence and set up an alert zone by providing a radius (or a neighborhood) for which the user wishes to receive an alert. For example, the user can sign-up for an event detected by any camera within alert zone 208.

During operation, a user in residence 230 signs up with system 200 for a notification of any event detected by any camera within neighborhood 206. Suppose that camera 222 detects an event. For example, camera 222 can detect the license plate of a known suspicious car and sends the event information to cloud 202. System 200 receives the event via cloud 202, obtains the contact information of all users signed up for an event detected by camera 222 (e.g., neighborhood 206 and alert zone 208), and sends a notification regarding the event to the corresponding users. During this process, the user in residence 230 receives the notification.

Figure 2B:
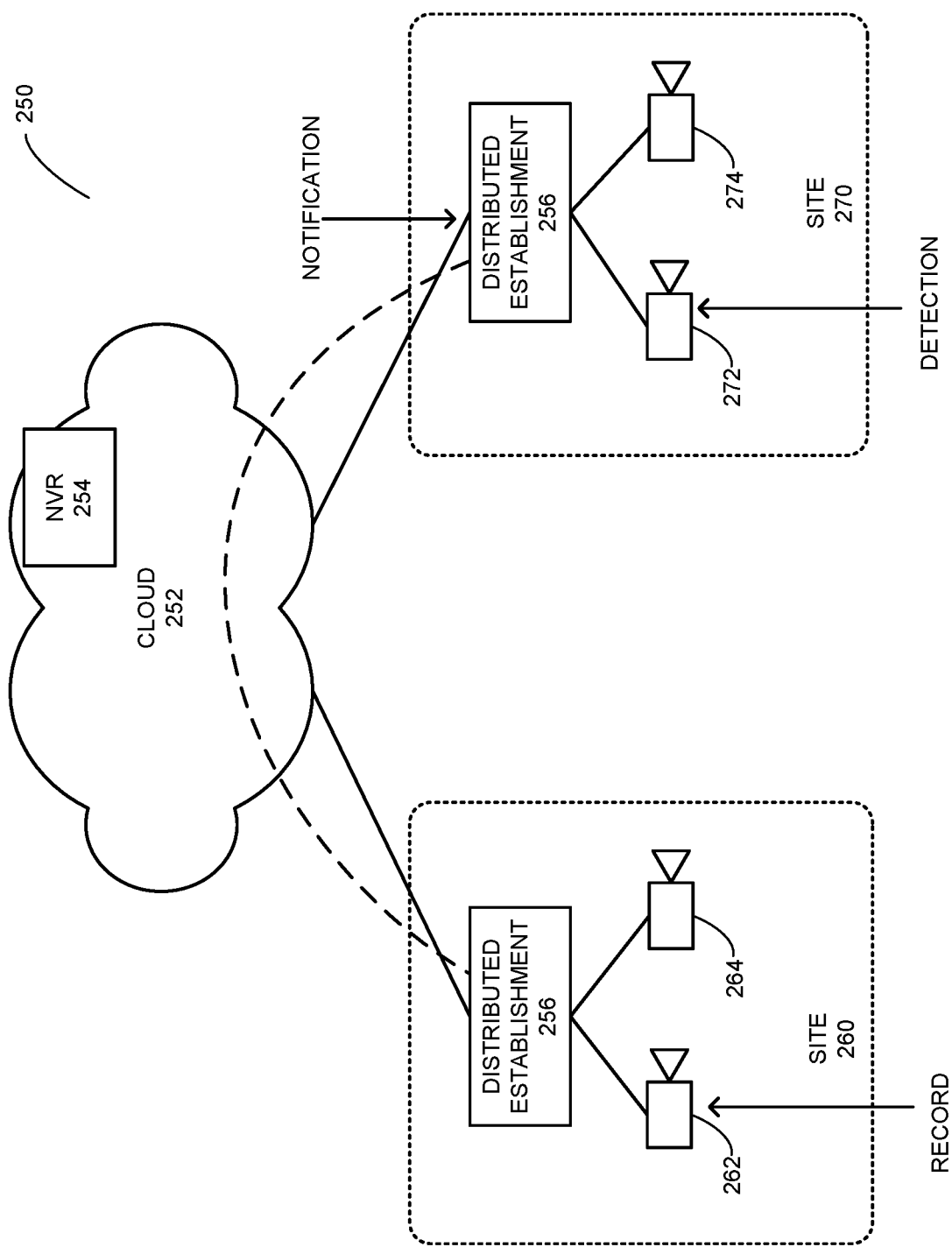
FIG. 2B illustrates an exemplary cloud-based video monitoring system with event notification support spanning a plurality of user sites, in accordance with one embodiment of the present invention.

FIG. 2B illustrates an exemplary cloud-based video monitoring system with event notification support spanning a plurality of user sites, in accordance with one embodiment of the present invention. In this example, a video monitoring system 250 is deployed in a distributed establishment 256 spanning sites 260 and 270. Examples of a distributed establishment include, but are not limited to, a grocery store, departmental store, shopping mall, and enterprise. Cameras 262 and 264 are deployed in site 260, and cameras 272 and 274 are deployed in site 270. A respective camera of system 250 is coupled to cloud 252 via one or more links. Video feed from a respective camera can be recorded in an NVR 254 in cloud 252. In some embodiments, system 250 facilitates event detection and notifies corresponding personnel of distributed establishment 256.

Whenever a camera in distributed establishment 256 detects an event, system 250 receives the event information. In some embodiments, NVR 254 can detect the event based on a camera feed from the camera. Suppose that distributed establishment 256 is a departmental store. During operation, camera 262 in site 260 detects and records a shop-lifting incident. System 200 receives and stores information associated with the incident (e.g., the video clip of the incident and/or the picture of the shop-lifter). If camera 272 detects the same person in site 270, system 250 sends a notification to the corresponding personnel of site 270 of distributed establishment 256. In this way, system 250 provides event-based services to distributed establishment 256.

Figure 2C:
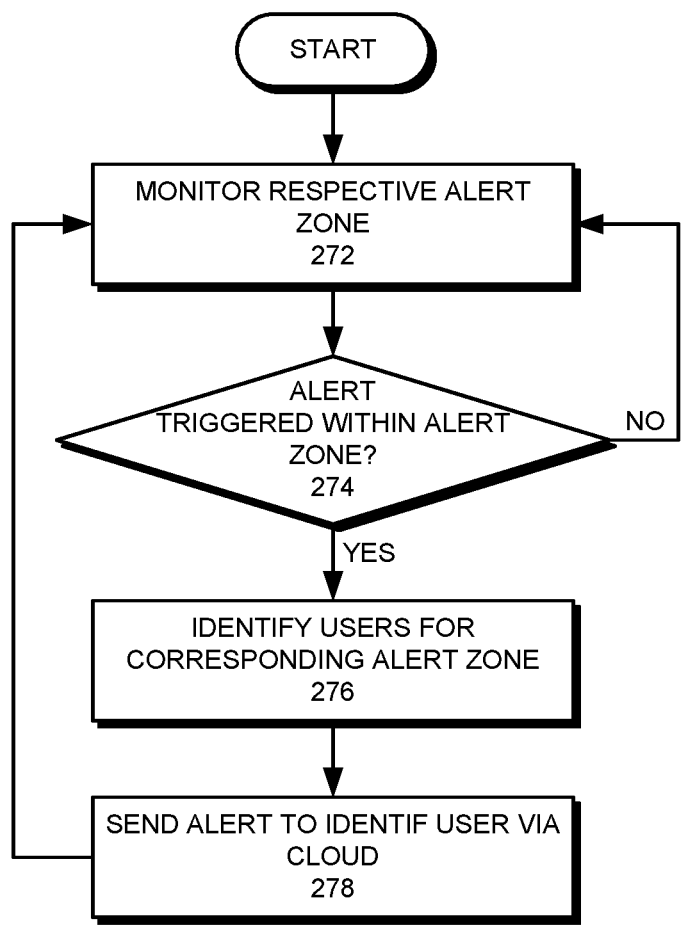
FIG. 2C presents a flowchart illustrating an exemplary event notification process of a cloud-based video monitoring system, in accordance with one embodiment of the present invention.

FIG. 2C presents a flowchart illustrating an exemplary event notification process of a cloud-based video monitoring system, in accordance with one embodiment of the present invention. During operation, the system continuously monitors a respective alert zone (operation 272). Note that an entire neighborhood or a multiple remote sites can belong to the same alert zone. The system then checks whether an alert has been triggered in an alert zone (operation 274). If so, the system identifies the users for the corresponding alert zone (operation 276) and sends alerts to the identified users via the cloud (operation 278). If an alert has not been triggered, the system continues monitoring a respective alert zone (operation 272).

Figure 3:
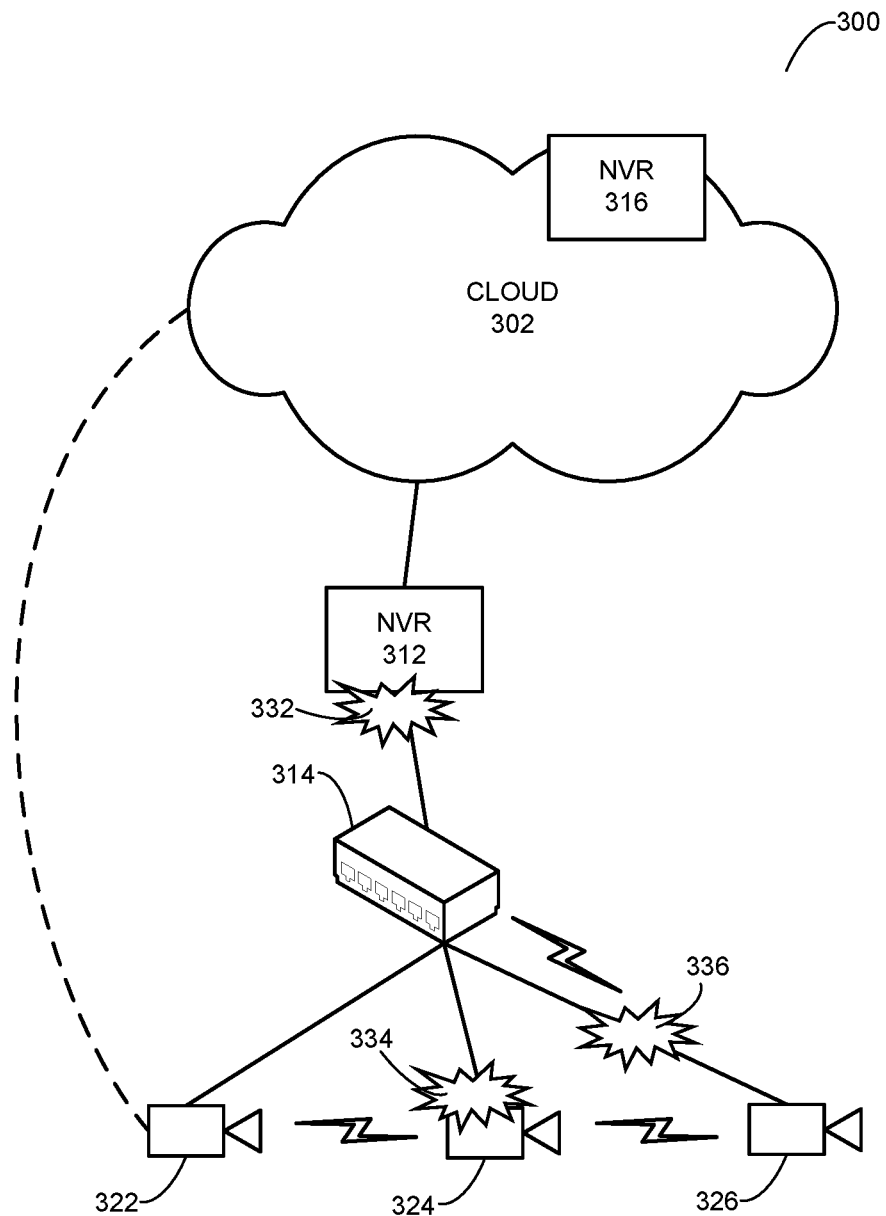
FIG. 3 illustrates an exemplary high-availability support for cloud-based video monitoring system, in accordance with one embodiment of the present invention.

FIG. 3 illustrates an exemplary high-availability support for cloud-based video monitoring system, in accordance with one embodiment of the present invention. In this example, a video monitoring system 300 is deployed with cameras 322, 324, and 326. A respective camera of system 300 is coupled to an NVR 312, which is coupled to cloud 302, via one or more wired or wireless links, and switch 314. The physical connection to cameras 322, 324, and 326 can be power over Ethernet, which provide both Ethernet connectivity and power to these cameras. NVR 312 records video feed from cameras 322, 324, and 326 in one or more supported formats.

In some embodiments, cameras 322, 324, and 326 include a local storage (e.g., a hard drive, flash drive, and/or SD card). Video recorded by these cameras can be stored in their respective local storage. In some embodiments, cameras 322, 324, and 326 support wireless communication among each other and with NVR 314. In some embodiments, cameras 322, 324, and 326 can have their own power source (e.g., a battery). This allows a camera to operate even when the physical connection to the camera fails. Note that a failure to the physical connection can fail both power supply and data connection to the camera.

Suppose that failure 332 causes NVR 312 to be unavailable. Examples of failure 332 include, but are not limited to, a physical failure to NVR 312, switch 314, and links between NVR 312 and a respective camera. If camera 322 has a video feed, either full or event-triggered, to stream, camera 322 can also have a connection with cloud 302 bypassing NVR 312. This connection between camera 322 and cloud 302 comprises one or more links. The video feed from camera 322 can be recorded in an NVR 316 in cloud 302. Camera 322 can also use a wireless connection to communicate with nearby cameras 324 and 326, and use the local storage of cameras 324 and 326 to record the video feed from camera 322. Similarly, cameras 324 and 326 can also use wireless connection to record their respective video feed in the storages of nearby cameras. In this way, cameras 322, 324 and 326 can operate as each other's backup in case of a failure. Examples of a wireless connection include, but are not limited to, Wi-Fi, Bluetooth, cellular, and microwave. Such a wireless connection can be based on ad-hoc, point-to-point, and/or multi-hop wireless mesh network formation.

Suppose that failure 334 causes camera 324 to be unavailable. Examples of failure 334 include, but are not limited to, a physical failure, destruction, and theft of camera 324. Under such a scenario, system 300 can obtain the already recorded video feed of camera 324 in NVR 312 and/or in storages of cameras 322 and 326. In this way, even when a camera is destroyed or stolen, the video feed the camera has already streamed can be preserved.

Suppose that failure 336 causes the physical connection to camera 326 to fail. Failure 336 can fail both power supply and data connection to camera 326. In response, camera 326 uses the local power source to operate. In some embodiments, under such a scenario, camera 326 can operate in a power saving mode by performing only the required operations. Camera 326 also establishes wireless communication with NVR 314 and/or with cameras 322 and 324. This allows camera 326 to operate even when both power supply and data connection to camera 326 has failed.

A video feed from a camera can be continuously streamed to the corresponding NVR, which records the video. However, in video monitoring, a large part of the video is eventless and does not contain useful information. Hence, continuous transmission can unnecessarily drain bandwidth of a network connection. On the other hand, the video feed can be continuously recorded in a local storage of the camera. However, such storage is usually constrained by limited disk space, cannot store arbitrarily long videos, and requires frequent updates to NVR. Furthermore, if an event-triggered recording is done at the NVR, the recording can lose important information by the time the camera stars streaming its video feed. On the other hand, if an event-triggered recording is done at the local storage, the recording cannot be arbitrarily long due to space limitation.

Figure 4A:
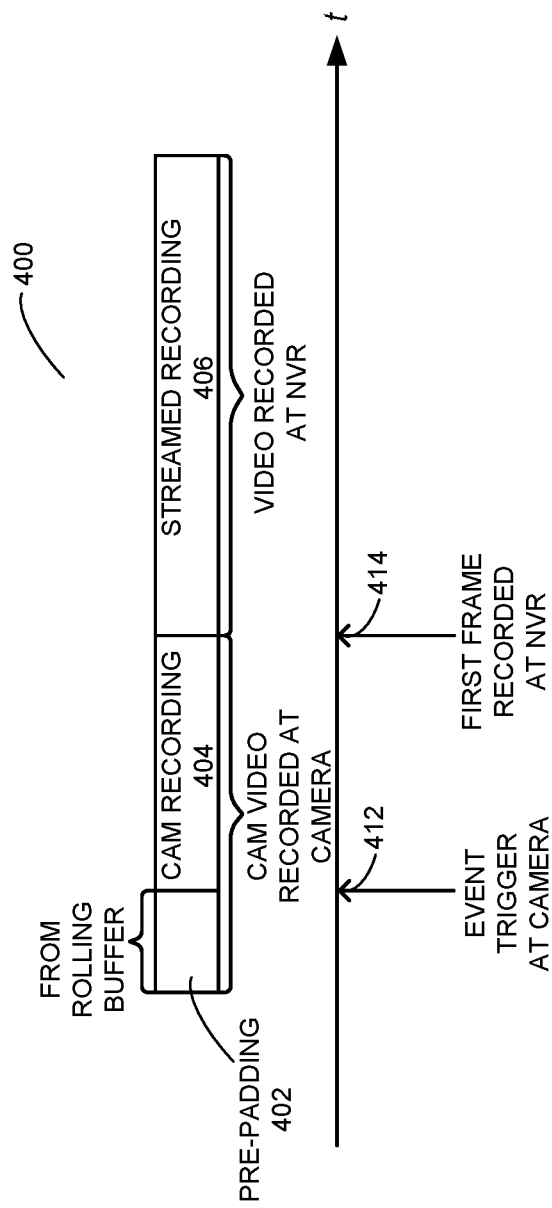
FIG. 4A illustrates an exemplary video integration of distributed video recordings, in accordance with one embodiment of the present invention.

To solve this problem, embodiments of the present invention facilitates distributed recording at the local storage of a camera and the corresponding NVR in conjunction with each other. FIG. 4A illustrates an exemplary video integration of distributed video recordings, in accordance with one embodiment of the present invention. In this example, a video file 400 is generated based on the video integration of distributed video recordings of a camera and an NVR. The camera always records the last x seconds (e.g., 10 seconds) in a rolling buffer. In response to an event trigger at time 412, the camera initiates a local recording, which is stored in the local storage. The camera obtains the last x seconds of recorded video from the rolling buffer and uses this video to create pre-padding 402. Pre-padding 402 and the local recording are stored at the camera.

Upon detecting the event, the camera also starts streaming its video feed to the corresponding NVR. In some embodiments, the camera always maintains a persistent connection with the NVR. The NVR receives the video feed at time 414, starts streamed recording 406 at the NVR, and sends the metadata of the first frame of recording 406 to the camera. Such metadata can include an identifier of the frame. Upon receiving the metadata, the camera obtains camera recording 404 from the loca storage. Recording 404 comprises video recording till the first frame recorded by the NVR. This ensures that recording 404 is non-overlapping tih recording 406. The camera then generates a camera video (cam video) file by pre-pending pre-padding 402 to camera recording 404. The camera then transmits this cam video to the NVR. The NVR receives the cam video and prepends the cam video to recording 406 to obtain the desired user video.

In some embodiments, the NVR also includes a rolling buffer for the video feed from the camera. Under such a scenario, the NVR generates pre-padding 402 from the rolling buffer. The camera can continuously stream the video feed to the NVR. When the event triggers, the NVR starts recording the streamed video feed and pre-pads the recorded video with the video from the rolling buffer. Under such a scenario, the NVR directly prepends pre-padding 402 to streamed recording 406.

Figure 4B:
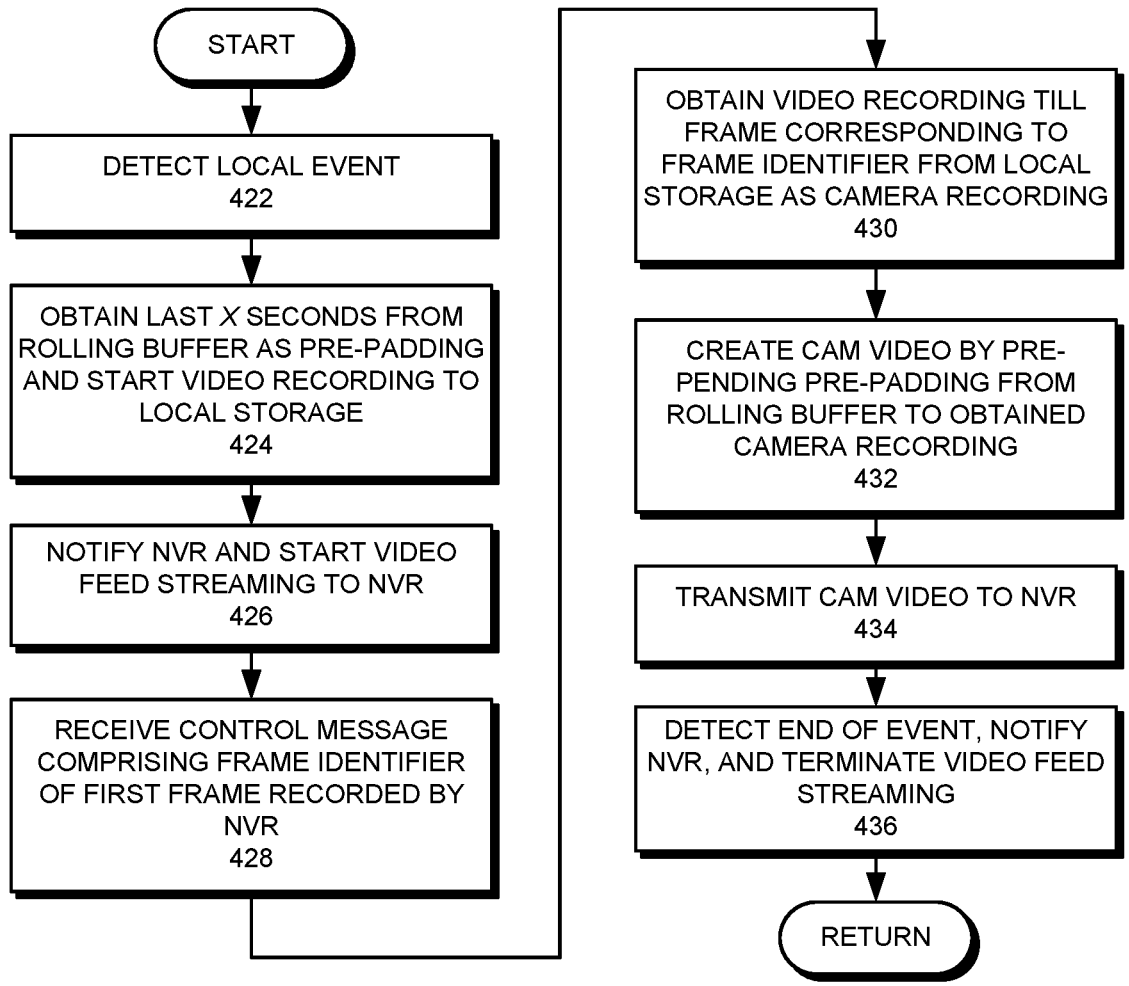
FIG. 4B presents a flowchart illustrating an exemplary process of a camera facilitating arbitrarily long motion event recordings, in accordance with one embodiment of the present invention.

FIG. 4B presents a flowchart illustrating an exemplary process of a camera facilitating arbitrarily long motion event recordings, in accordance with one embodiment of the present invention. Upon detecting a local event (operation 422), the camera obtains the last x seconds from a local rolling buffer as pre-padding and starts recording videos to the local storage (operation 424), as described in conjunction with FIG. 4A. The value of x can be configured by a user or take a default value. The camera then notifies a corresponding NVR and starts streaming its video feed to the NVR (operation 426). This NVR can be a local NVR, a remote NVR at a remote site, or in the cloud. In some embodiments, the camera maintains a persistent data connection with the NVR. The camera uses this data connection as the streaming channel for its video feeds and streams the video feed to the NVR via this streaming channel.

The camera then receives a control message from NVR comprising a frame identifier of the first frame recorded by the NVR (operation 428). The camera obtains video recording till the frame corresponding to the frame identifier from local storage as camera recording (operation 430) and creates a cam video by pre-pending the pre-padding from rolling buffer to the obtained camera recording (operation 432), as described in conjunction with FIG. 4A. The camera transmits the cam video to the NVR (operation 434). In some embodiments, the camera uses a separate channel than the streaming channel to transmit the cam video. In some embodiments, the camera detects the end of event, notifies the NVR, and terminates the streaming of its video feed (operation 436).

Figure 4C:
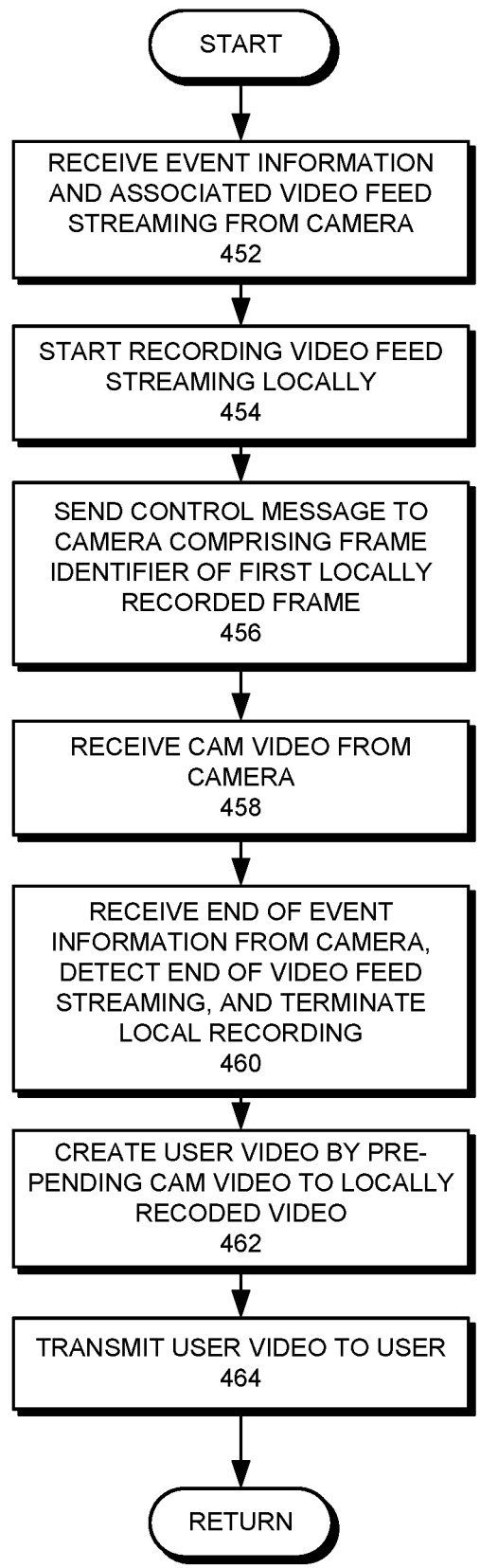
FIG. 4C presents a flowchart illustrating an exemplary process of a network video recorder (NVR) facilitating arbitrarily long motion event recordings, in accordance with one embodiment of the present invention.

FIG. 4C presents a flowchart illustrating an exemplary process of an NVR facilitating arbitrarily long motion event recordings, in accordance with one embodiment of the present invention. Upon receiving an event information and associated video feed streaming from a camera (operation 452), the NVR starts recording the streaming video feed locally (operation 454). The NVR sends a control message to the camera comprising a frame identifier of the first locally recorded frame (operation 456). The NVR then receives the cam video from the camera (operation 458), which is non-overlapping with the locally recorded video. In some embodiments, the NVR receives an end of event information from the camera, detects the end of the video feed streaming, and terminates the local recording (operation 460). The NVR then creates the user video by pre-pending the cam video to locally recorded video (operation 462), and transmits the user video to the user (operation 464). In some embodiments, the NVR transmits the user video in response to a request from the user (e.g., a request from a streaming server).

In some embodiments, the camera maintains a rolling buffer for a respective video frame of the video feed streaming to the NVR. These frames are cleared from the rolling buffer upon receiving a confirmation from the NVR. This ensures that the video frames are stored in the local storage of the camera until they are received by the NVR. Upon receiving a video frame, the NVR sends a confirmation (e.g., an acknowledgement) to the camera. A respective video frame from the rolling buffer is retransmitted to the NVR either until a confirmation from the NVR is received, or the rolling buffer becomes full and overwrites a frame with a newer one, which may indicate a bad network condition or an outage.

Figure 5A:
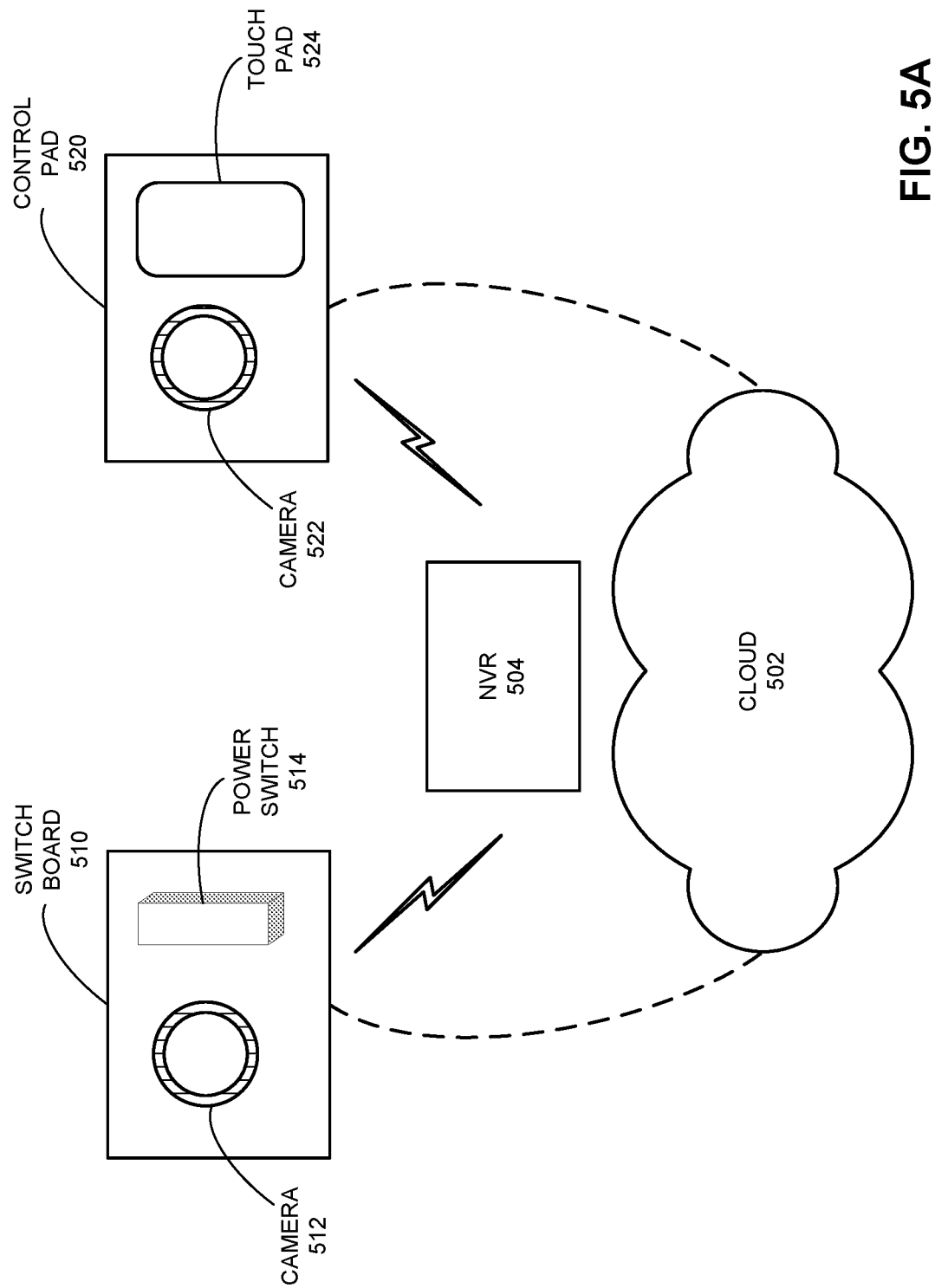
FIG. 5A illustrates an exemplary integration of wall input outlet with video monitoring system, in accordance with one embodiment of the present invention.

In some embodiments, a camera can be small enough to fit within a wall input outlet. FIG. 5A illustrates an exemplary integration of wall input outlet with a video monitoring system, in accordance with one embodiment of the present invention. A camera can be integrated with any input outlet mounted on a wall (referred to as a wall input outlet), such as a key pad of a security system, a switch board, and a touch pad. In this example, camera 512 is integrated with a switch board 510, which includes a power switch 514. A camera 522 can be integrated with a wall control pad 520, which includes a touch pad 524. Touch pad 524 can control indoor power (e.g., turning on/off a light) and/or security (e.g., turning on/off an alarm). Furthermore, the touch pad can also operate as a tablet.

Cameras 512 and 522 can be coupled with a local NVR 504 and/or cloud 502 via wired and/or wireless connections. In some embodiments, cameras 512 and 522 can be connected to power-over-Ethernet cables from the cable duct within the walls on which switch board 510 and control pad 520 is mounted, respectively. Cameras 512 and 522 can facilitate indoor video monitoring (e.g., indoor video surveillance and baby monitoring) without requiring installation of additional cameras. In some embodiments, cameras 512 and 514 facilitate advanced service based on integrated features, such as facial recognition. For example, if camera 512 detects a child operating power switch 514, camera 512 can preclude power switch 514 from performing its operation. In another example, if camera 522 detects a stranger operating touch pad 524, camera 522 can instruct touch pad 524 to perform additional security check for disarming a security system.

Figure 5B:
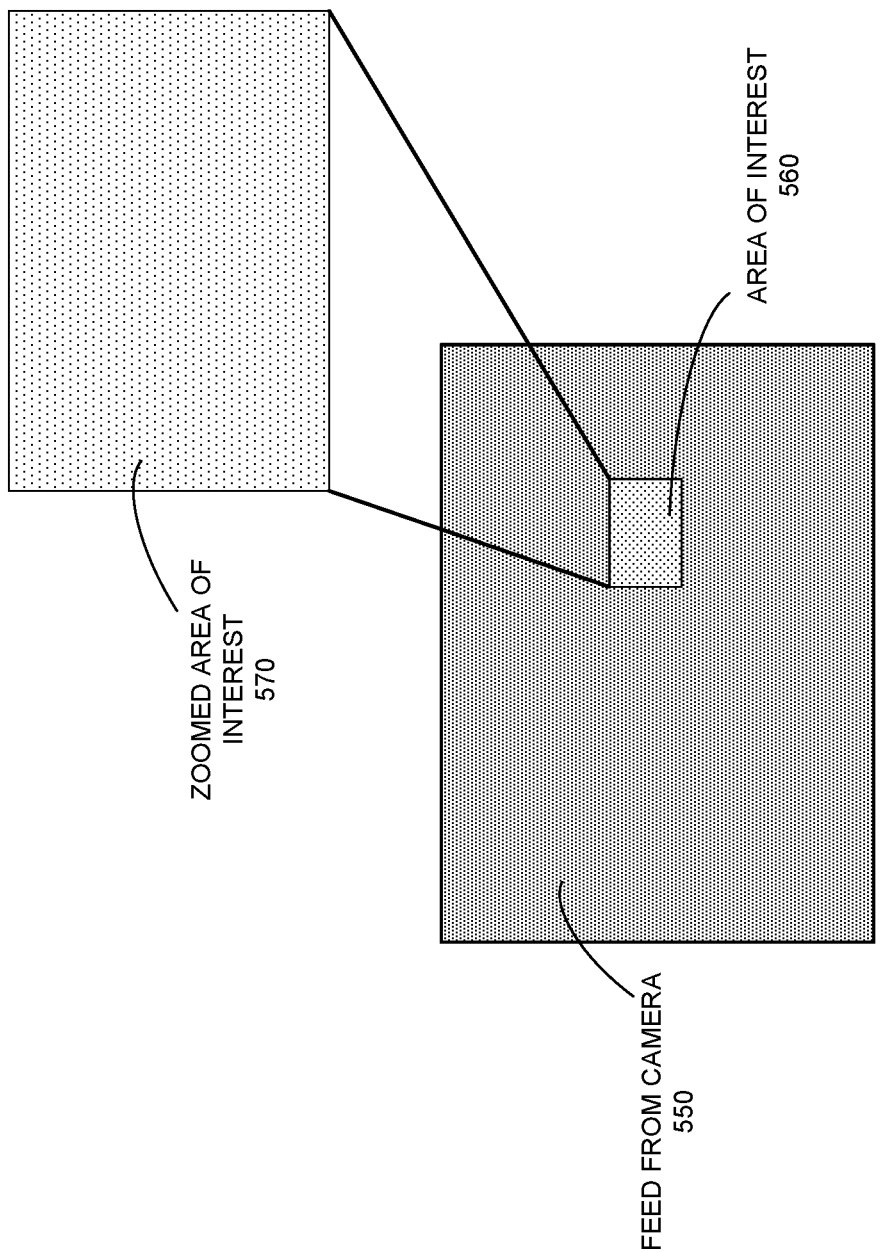
FIG. 5B illustrates an exemplary electronic selection of area of interest from a video feed, in accordance with one embodiment of the present invention.

If a camera is equipped with an ultra wide-angle lens (usually referred to as fisheye lens), specific area of the corresponding video feed or recording from an NVR can be electronically pointed and zoomed. FIG. 5B illustrates an exemplary electronic selection of area of interest from a video feed, in accordance with one embodiment of the present invention. Such a selection allows a user to control the direction and zoom of a camera without physically changing the orientation of the camera. This feature is referred to as electronic pan-tilt-zoom (ePTZ). In this example, a user receives a video feed 550 from a camera, which can be an ePTZ camera. If the user identifies an area of interest 560 in video feed 550, the user can select that area to obtain a zoomed area of interest 570. The user can perform the selection and zooming operations based on an input to video feed 550 via a user input device. Examples of a user input device include, but are not limited to, a pointing device (e.g., a mouse), touch screen, joystick, roller-ball, and grid-screen (e.g., a screen divided into grids).

Figure 6A:
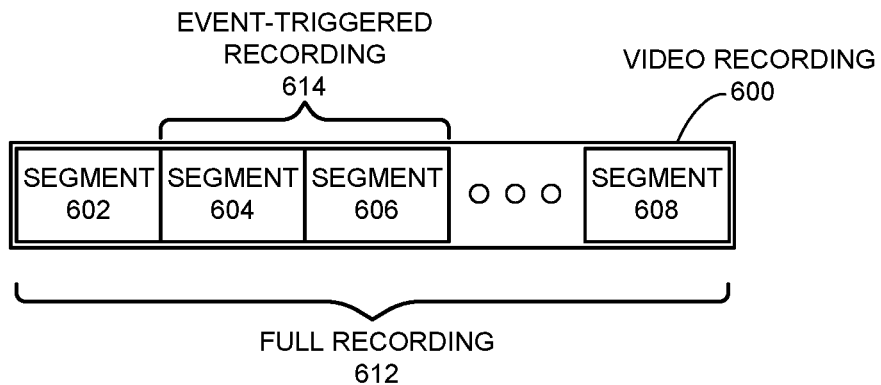
FIG. 6A illustrates an exemplary segmented video storage, in accordance with one embodiment of the present invention.

A user may require both full and event-triggered recordings for a video feed. This can lead to creation of multiple video recording files for the same video feed. To solve this problem, in some embodiments, a video can be stored at a small granularity (e.g., segment-level granularity). FIG. 6A illustrates an exemplary segmented video storage, in accordance with one embodiment of the present invention. A video recording file 600 is stored at a segment-level granularity. Video recording file 600 includes a number of video segment files 602, 604, 606, and 608. A respective video segment typically include an I-frame (Intra-coded frame), which specifies a full picture. The segment can also include P-frames (Predicted frame) and/or B-frames (Bi-predictive frame), which specify a difference in the frame with respect to the corresponding I-frame. A video segment file can include one or more video segments.

By storing video recording file 600 based on a segment-level granularity, a video monitoring system can produce both full and event-triggered video streaming to user. In this example, all segments can be combined to generate the video stream of a full recording 612. Suppose that an event is captured in segments 604 and 606. The system can combine simply segments 604 and 606 to generate the corresponding video streaming of event-triggered recording 614. In this way, segments 604 and 606 are stored only once, but used to generate the video streamings of both recordings 612 and 614.

Furthermore, segment-level granularity allows the system to stream videos to a user based on the user device. For example, if a user is accessing a video streaming via a smartphone, the system can stream individual segments to the smartphone, which in turn, contiguously plays these segments to produce the corresponding video. On the other hand, if a user is accessing a video streaming via a computer, the system can combine the files, encode the combined file based on a standard streaming standard, and stream the encoded file.

Figure 6B:
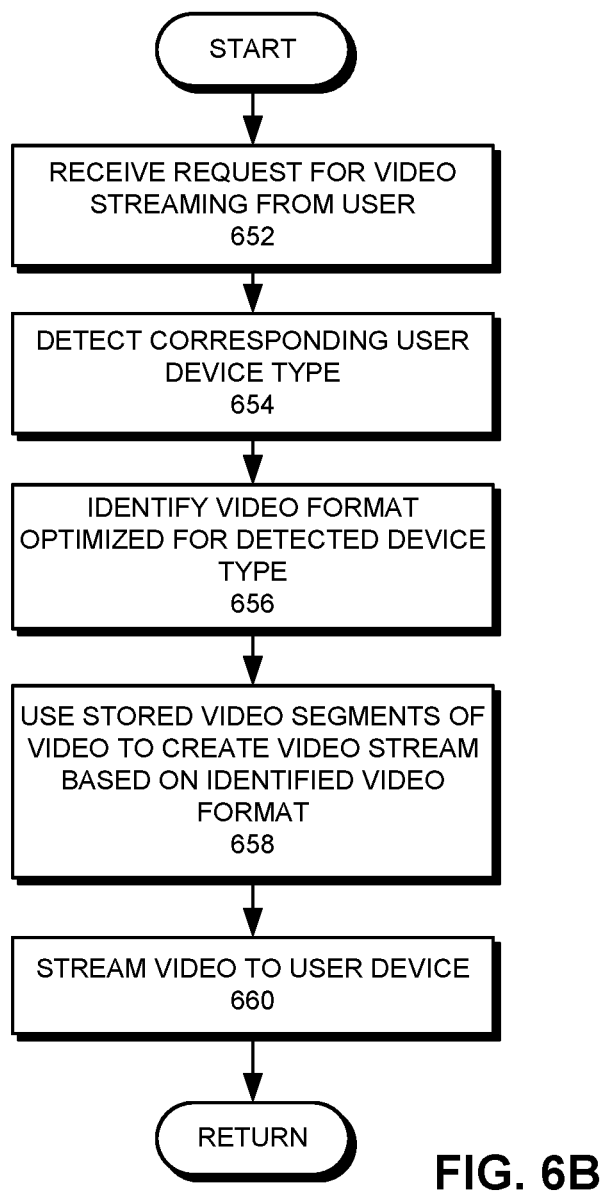
FIG. 6B presents a flowchart illustrating an exemplary video streaming process of an NVR based on user device type, in accordance with one embodiment of the present invention.

FIG. 6B presents a flowchart illustrating an exemplary video streaming process of an NVR based on user device type, in accordance with one embodiment of the present invention. During operation, the NVR receives a request for a video streaming from a user (operation 652) and detects the corresponding user device type (operation 654). The system then identifies the video format optimized for the detected device type (operation 656) and uses stored video segments of the video to create a video stream based on the identified format (operation 658), as described in conjunction with FIG. 6A. The system then streams the video to the user device (operation 660).

Figure 7A:
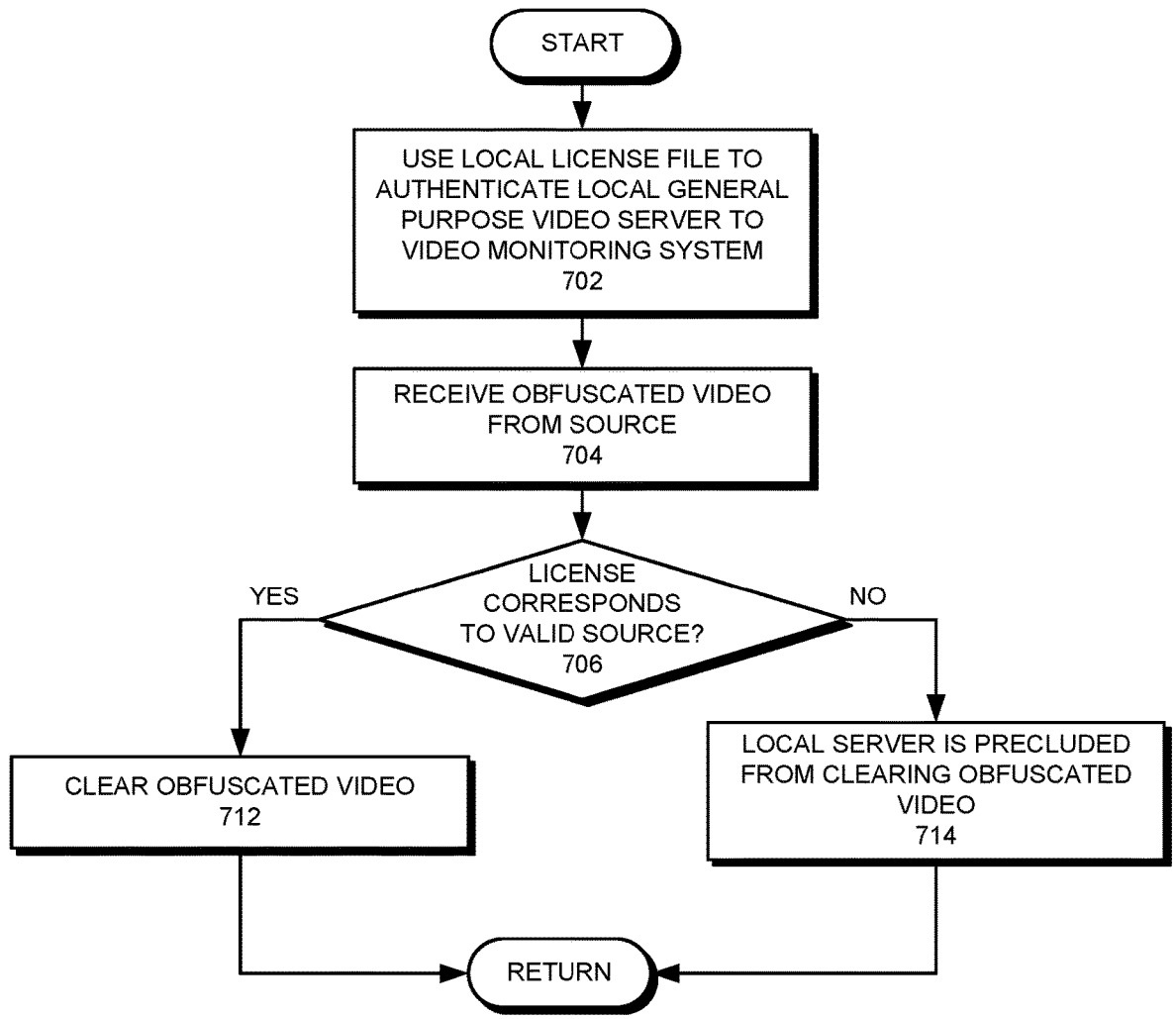
FIG. 7A presents a flowchart illustrating an exemplary process of a general purpose video server receiving a obfuscated video stream, in accordance with one embodiment of the present invention.

Often a user may use a general-purpose video server, such as Evostream, to obtain a video stream from the video monitoring system. Embodiments of the present invention ensures that the video monitoring system checks whether the license file used in the server corresponds to the video monitoring system. FIG. 7A presents a flowchart illustrating an exemplary process of a general purpose video server receiving a obfuscated video stream, in accordance with one embodiment of the present invention. During operation, the server uses a local license file to authenticate the server to a video monitoring system (operation 702). In response, the server starts receiving obfuscated video from source (e.g., an NVR of the video monitoring system) (operation 704). The server checks whether the license corresponds to a valid source (operation 706). If so, the server clears the obfuscated video (operation 712). Otherwise, the local server is precluded from clearing the obfuscated video (operation 714).

Figure 7B:
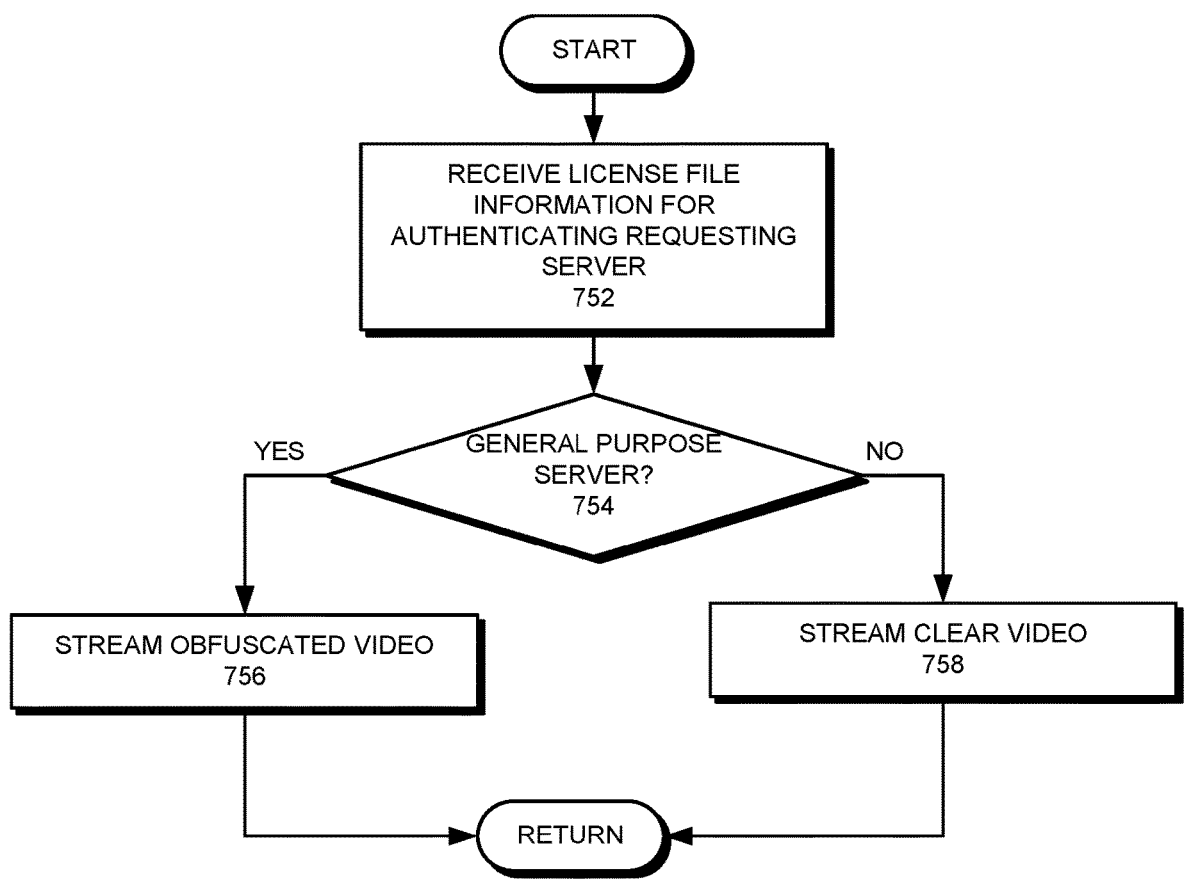
FIG. 7B presents a flowchart illustrating an exemplary process of a video monitoring system streaming an obfuscated video stream, in accordance with one embodiment of the present invention.

FIG. 7B presents a flowchart illustrating an exemplary process of a video monitoring system streaming an obfuscated video stream, in accordance with one embodiment of the present invention. During operation, the system receives license file information for authenticating a requesting server (operation 752). The system then checks whether the server is a general purpose server, such as Evostream (operation 754). If so, the system streams obfuscated video (operation 756). Otherwise, the system streams clear video (operation 758).

Figure 8A:
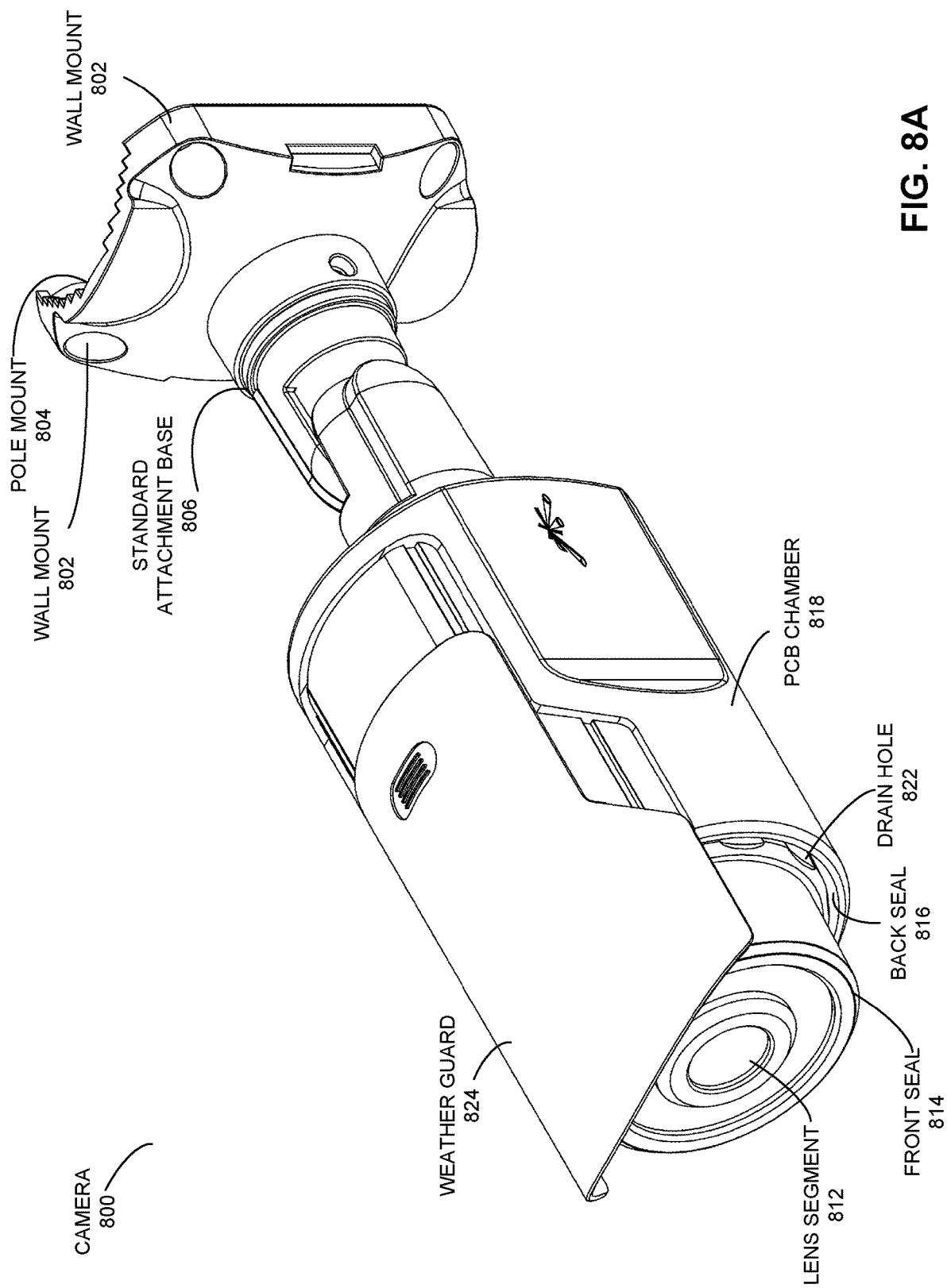
FIG. 8A illustrates an exemplary camera with integrated wall and pole mount, sealed lens segment, and drain holes, in accordance with one embodiment of the present invention.

FIG. 8A illustrates an exemplary camera with integrated wall and pole mount, sealed lens segment, and drain holes, in accordance with one embodiment of the present invention. In this example, a camera 800 includes a base with both wall mount 802 and pole mount 804. Wall mount 802 is on the side and has a flat base. This allows the camera to be mounted on a flat surface, such as a wall. Pole mount 804 resides between the two sides of wall mount 802. Pole mount 804 is curved to accommodate the outer curve of a pole and has teeth for better grip to a pole. Camera 800 further includes a standard attachment base 806 with thread. Any pole with supporting diameter and thread can be attached to base 806 and mount camera 800.

Camera 800 further includes a lens segment 812 comprising the camera lens and an array of Light Emitting Diode (LED) lights. The back of lens segment 812 provides a slot for a local storage (e.g., an SD card). A Printed Circuit Board (PCB) comprising the control circuitry for camera 800 can also be plugged into the back of lens segment 812. A front seal 814 can be screwed-on to lens segment 812. Front seal 814 completely seals the font of lens segment 812. Lens segment 812 with the attached PCB can be inserted into an empty PCB chamber through a back seal 816, which completely seals the gap between lens segment 812 and the opening of PCB chamber 818. Front seal 814 and back seal 816 provide an air-tight and waterproof sealing to lens segment 812, thereby preventing condensation and fogging within lens segment 812. In some embodiments, lens segment also includes desiccants to ensure dryness.

In some embodiments, PCB chamber 818 has a socket for connecting an Ethernet cable. Such socket also supports power over Ethernet and enables power supply to camera 800. Camera 800 can include a weather guard 824 to protect camera 800 from rain and sun. Camera 800 can also include drain holes 822, which allows rain water to pass through when camera 800 is tilted upward.

Figure 8B:
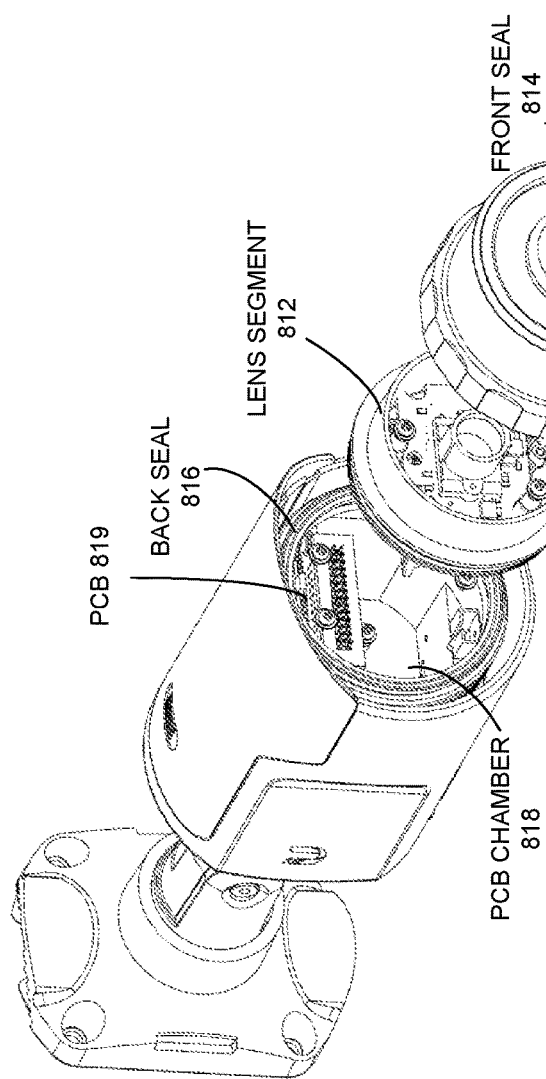
FIG. 8B presents an exploded view of the camera illustrated in FIG. 8A.

FIG. 8B presents an exploded view of the camera illustrated in FIG. 8A. In this view, front seal 814 can be secured to back seal 816 and form a enclosure that can protect lens segment 812 from the natural elements of weather. PCB chamber 818 provides the space needed to accommodate a PCB 819 which can be coupled to the back of lens segment 812.

Figure 8D:
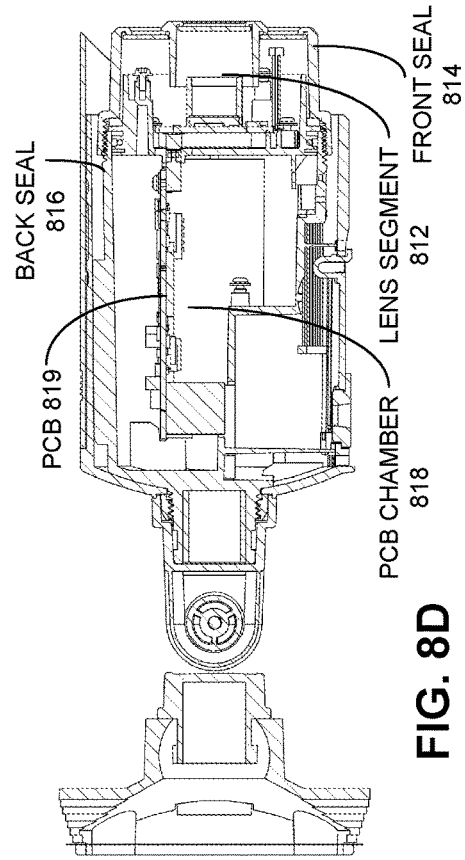
FIG. 8D presents a vertical cross-section view of the camera illustrated in FIG. 8A
Figure 8C:
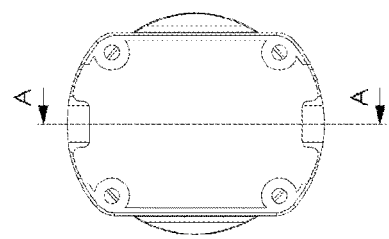
FIG. 8C presents a back view of lens segment 812.

FIG. 8C presents a back view of lens segment 812. As illustrated in this view, the back side of lens segment 812 has a multi-pin connector which can couple to PCB 819.

FIG. 8D presents a vertical cross-section view of the camera illustrated in FIG. 8A. In this view, front seal 814 is screwed-on to back seal 816 which form an enclosed space for lens segment 812. PCB 819 is coupled to the back side of lens segment 812 and resides securely in PCB chamber 818.

FIGS. 8E, 8F, and 8G present a top view, front view, and side view of the camera illustrated in FIG. 8A, respectively.

Figure 8H:
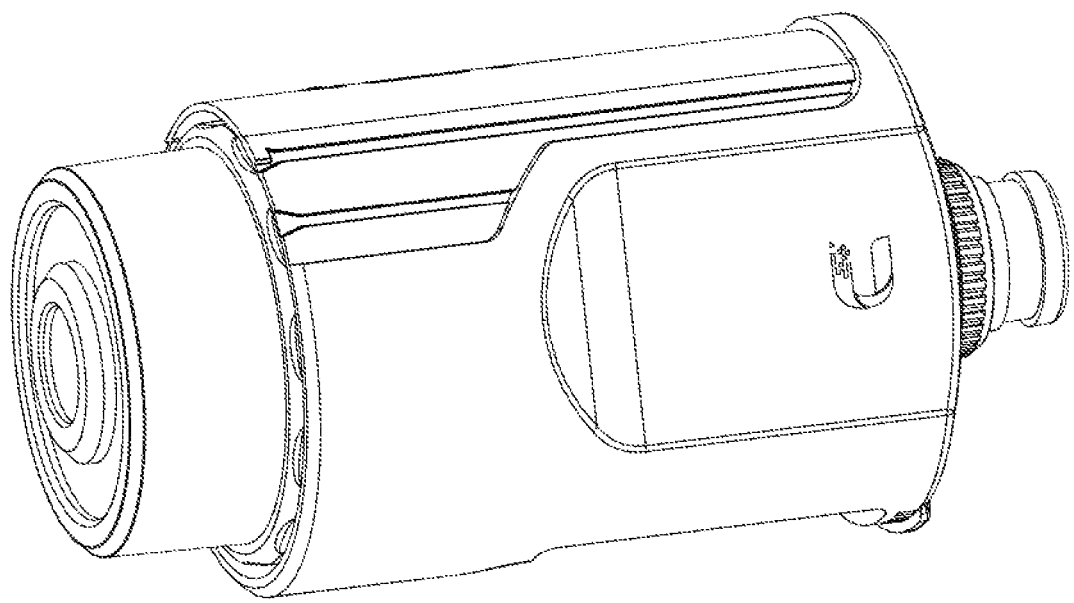
FIG. 8H presents a broken-down view of the camera body of the camera illustrated in FIG. 8A, in accordance with one embodiment of the present invention.
Figure 8I:
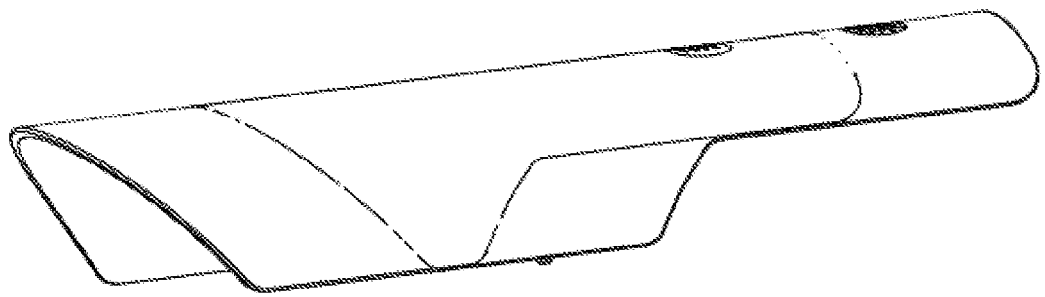
FIG. 8I presents a broken-down view of the weather guard of the camera illustrated in FIG. 8F, in accordance with one embodiment of the present invention.
Figure 8J:
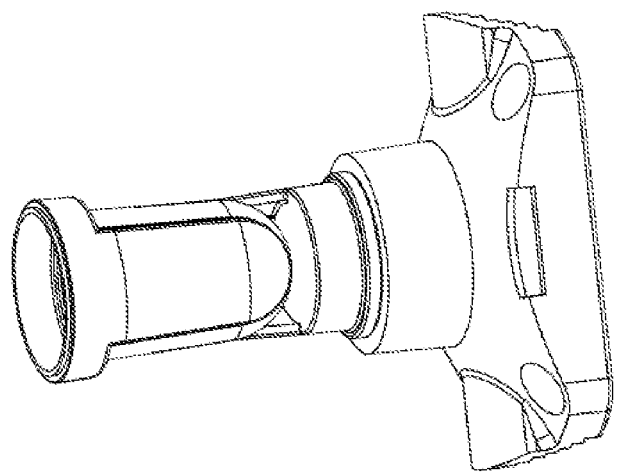
FIG. 8J presents a broken-down view of the camera attachment base and the ceiling/pole mount of the camera illustrated in FIG. 8A, in accordance with one embodiment of the present invention.

FIGS. 8H, 8I, and 8J present broken-down views of the camera body, weather guard, and camera attachment base and the ceiling/pole mount of the camera illustrated in FIG. 8A, respectively.

Figure 8K:
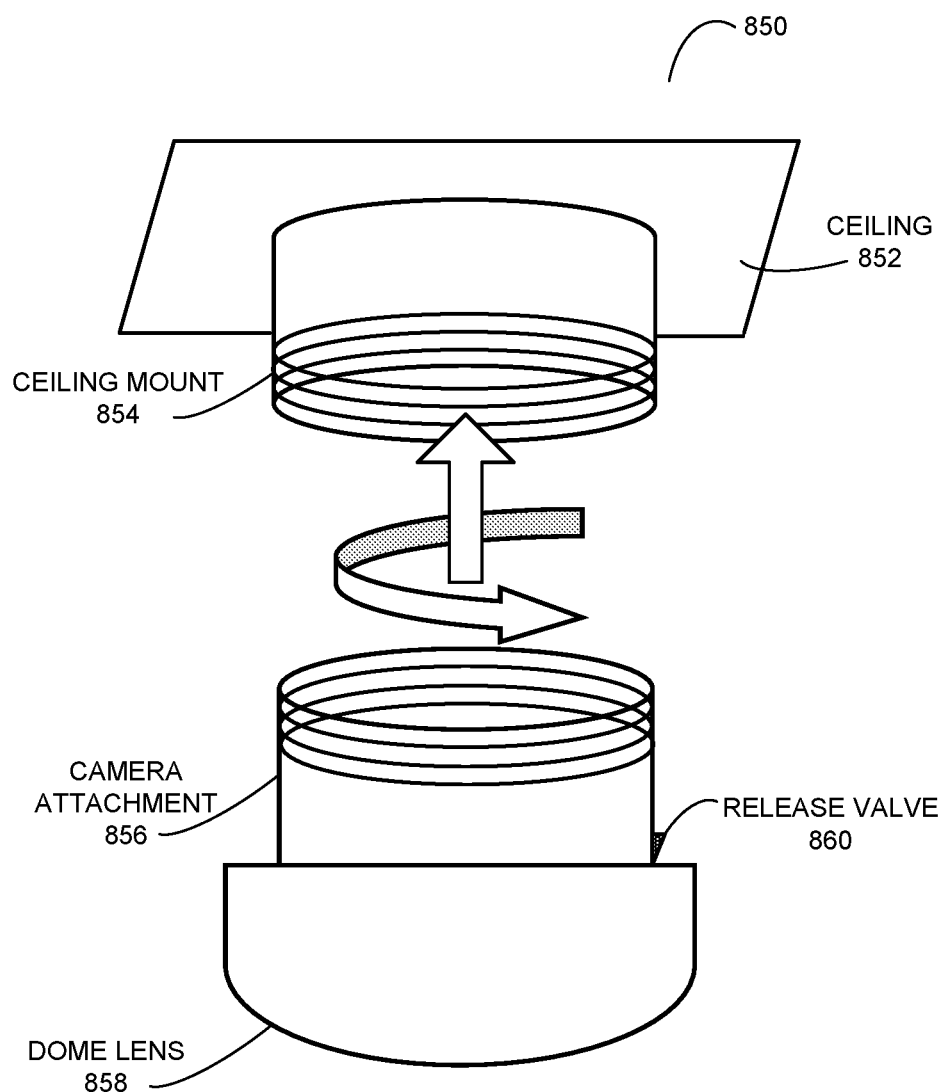
FIG. 8K illustrates an exemplary screw-on dome camera attachable to a ceiling mount, in accordance with one embodiment of the present invention.

FIG. 8K illustrates an exemplary screw-on dome camera attachable to a ceiling mount, in accordance with one embodiment of the present invention. A dome camera 850 includes ceiling mount 854, which can be attached to ceiling 852. Ceiling mount 854 includes threads and provides an opening for a camera attachment 856 of dome camera 850. A dome lens 858 can be inserted into camera attachment 856. A release valve 860 keeps dome lens 858 attached to camera attachment 856. Pressing release valve 860 releases dome lens 858 from camera attachment 856. Camera attachment 856 can be screwed-on to ceiling mount 854. Hence, once ceiling mount 854 is attached to ceiling 852, rest of the camera assembly of dome camera 850 can simply be screwed on without requiring any additional hardware.

Figure 9A:
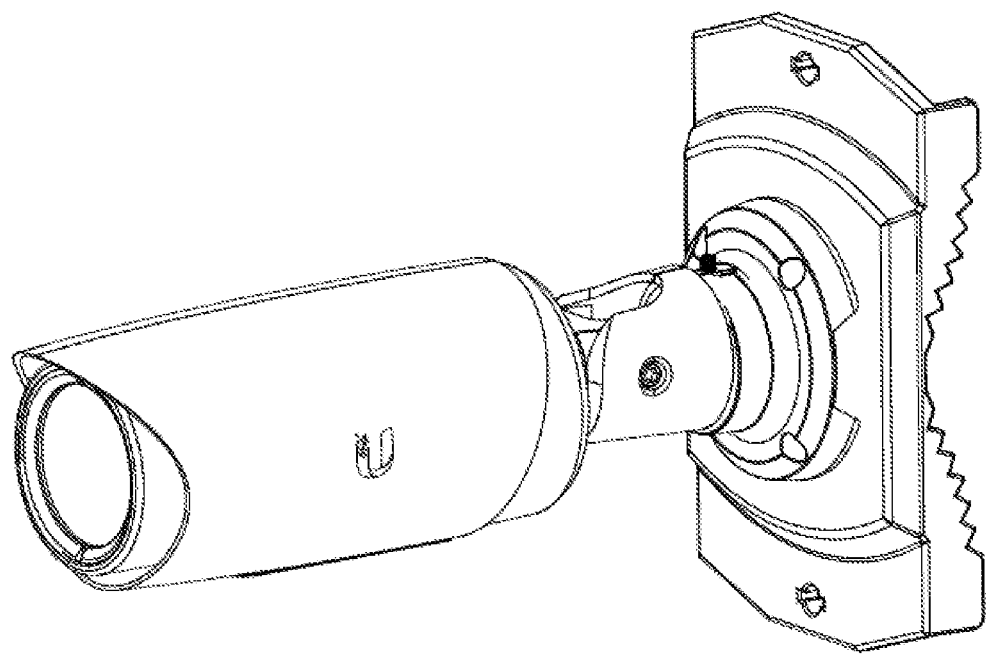
FIG. 9A illustrates another exemplary camera in accordance with one embodiment of the present invention.
Figure 9B:
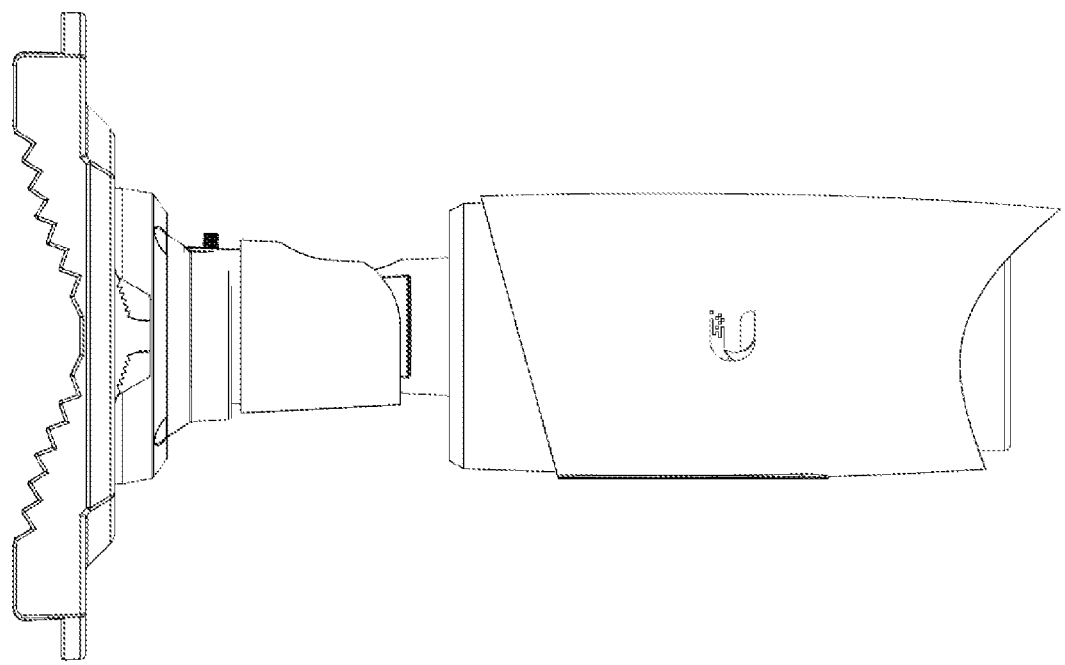
FIG. 9B presents a side view of the camera illustrated in FIG. 9A, in accordance with one embodiment of the present invention.
Figure 9C:
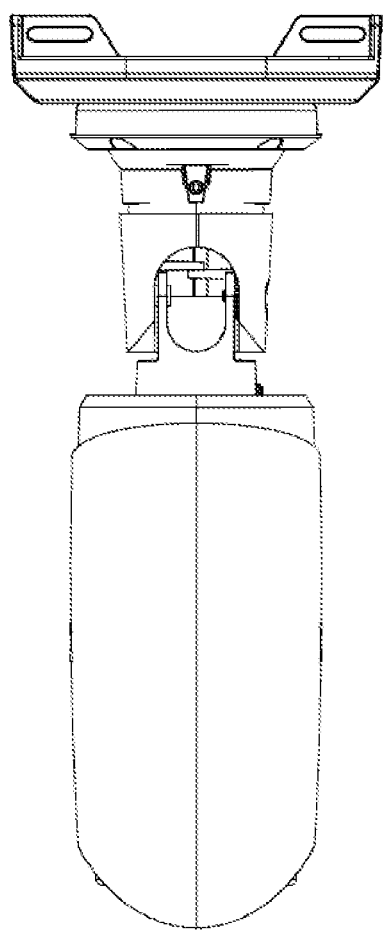
FIG. 9C presents a top view of the camera illustrated in FIG. 9A, in accordance with one embodiment of the present invention.
Figure 9D:
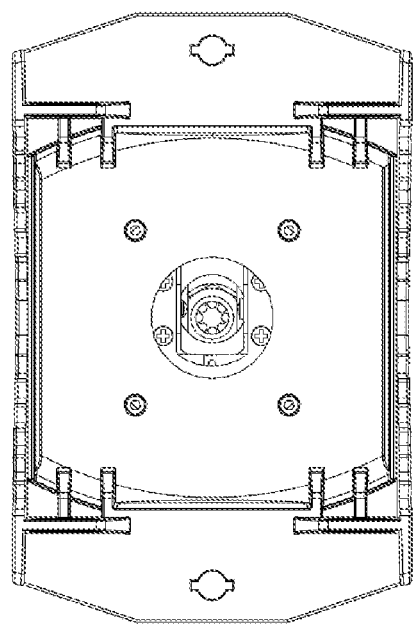
FIG. 9D presents a back view of the camera illustrated in FIG. 9A, in accordance with one embodiment of the present invention.
Figure 9E:
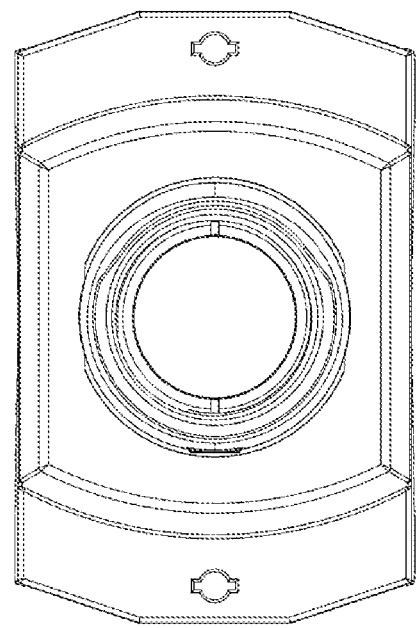
FIG. 9E presents a front view of the camera illustrated in FIG. 9A, in accordance with one embodiment of the present invention.

FIG. 9A illustrates another exemplary camera in accordance with one embodiment of the present invention.

FIGS. 9B, 9C, 9D, and 9E presents a side view, a top view, a back view, and a front view of the camera illustrated in FIG. 9A, respectively.

Figure 9F:
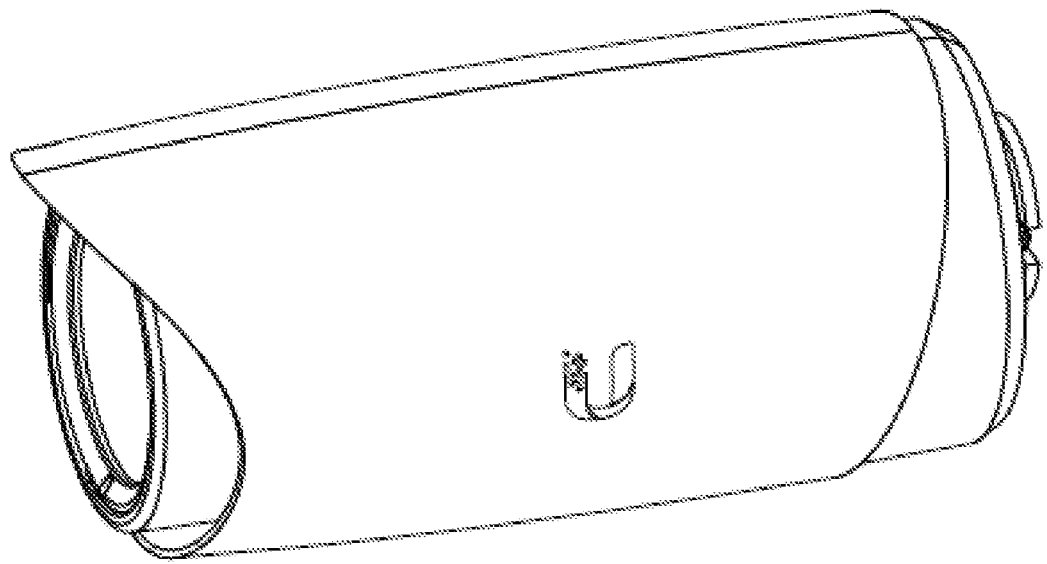
FIG. 9F presents a broken-down view of the camera body of the camera illustrated in FIG. 9A, in accordance with one embodiment of the present invention.
Figure 9G:
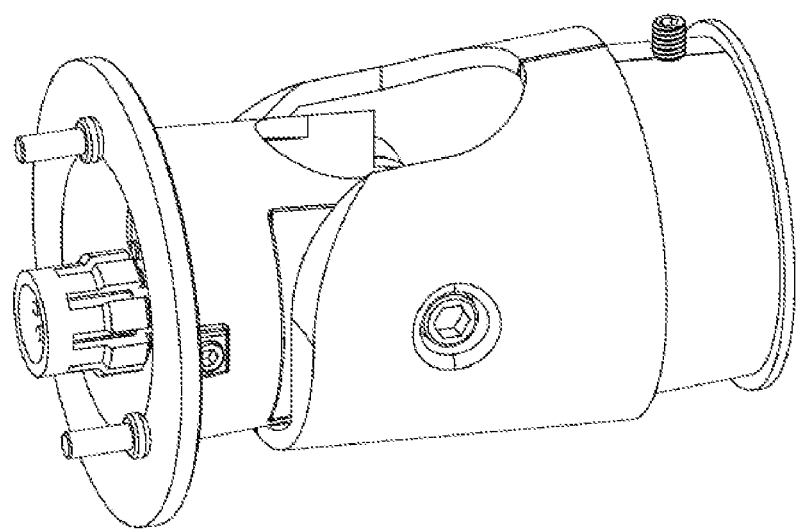
FIG. 9G presents a broken-down view of the camera attachment base of the camera illustrated in FIG. 9A, in accordance with one embodiment of the present invention.
Figure 9H:
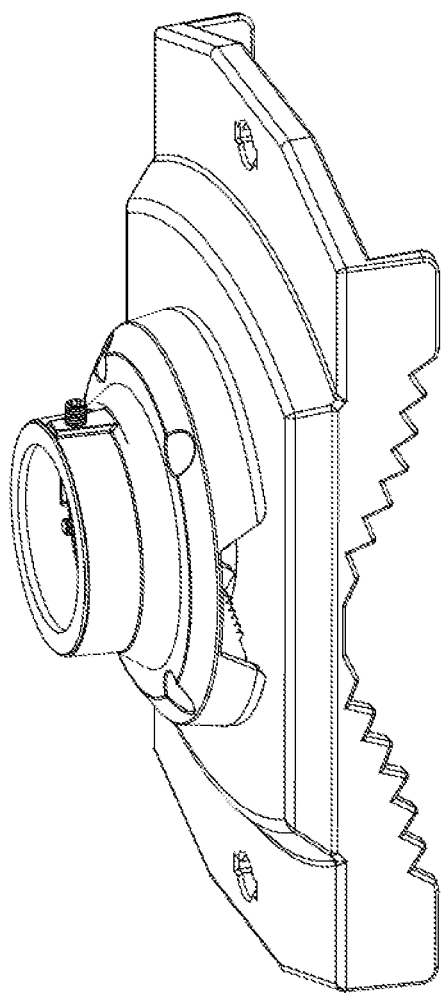
FIG. 9H presents a broken-down view of the pole mount of the camera illustrated in FIG. 9A, in accordance with one embodiment of the present invention.

FIGS. 9F, 9G, and 9H presents broken-down views of the camera body, the camera attachment base, and the pole mount of the camera illustrated in FIG. 9A, respectively.

Exemplary Systems

Figure 10A:
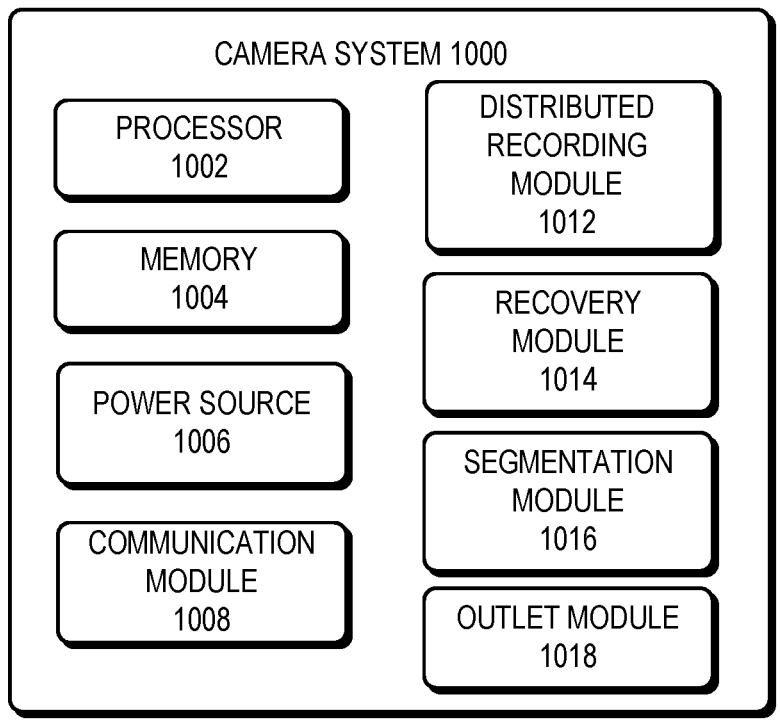
FIG. 10A illustrates an exemplary camera system of a cloud-based video monitoring system, in accordance with one embodiment of the present invention.

FIG. 10A illustrates an exemplary camera system of a cloud-based video monitoring system, in accordance with one embodiment of the present invention. In this example, a camera system 1000 includes a processor 1002, a memory 1004, a power source 1006, and a communication module 1008, which can include a power over Ethernet port and a Wi-Fi interface (not shown).

Also included in camera system 1000 are a distributed recording module 1012, a recovery module 1014, a segmentation module 1016, and an outlet module 1018. During operation, distributed recording module 1012 performs distributed recording of event-triggered videos, as described in conjunction with FIGS. 4A-4C. Recovery module 1014 performs failure recovery process described in conjunction with FIG. 3. Segmentation module 1016 facilitates storing videos at a segment-level granularity, as described in conjunction with FIG. 6A. Outlet module 1018 performs operation control of wall input outlets, as described in conjunction with FIG. 5A.

Figure 10B:
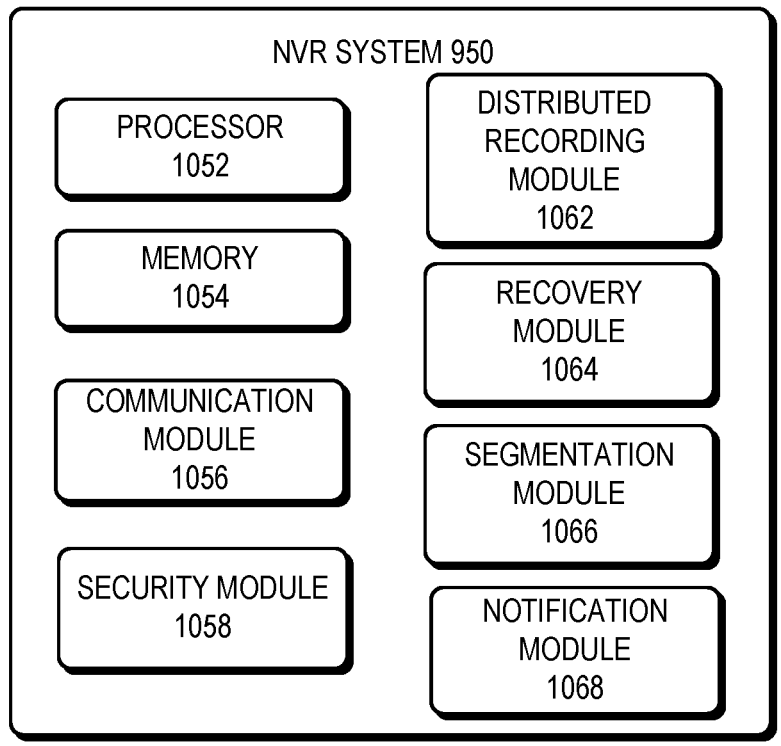
FIG. 10B illustrates an exemplary NVR system of a cloud-based video monitoring system, in accordance with one embodiment of the present invention.

FIG. 10B illustrates an exemplary NVR system of a cloud-based video monitoring system, in accordance with one embodiment of the present invention. In this example, an NVR system 1050 includes a processor 1052, a memory 1054, and a communication module 1056, which can include a power over Ethernet port and a Wi-Fi interface (not shown).

Also included in NVR system 1050 are a distributed recording module 1062, a recovery module 1064, a segmentation module 1066, a notification module 1068, and a security module 1058. During operation, distributed recording module 1062 performs distributed recording of event-triggered videos, as described in conjunction with FIGS. 4A-4C. Recovery module 1064 performs failure recovery process described in conjunction with FIG. 3. Segmentation module 1066 stores videos at a segment-level granularity and streams video based on the segment-level granularity, as described in conjunction with FIGS. 6A-6B. Notification module 1068 facilitates notification to users based on an event triggered by camera system 1000, as described in conjunction with FIGS. 2A-2B. Security module 1058 facilitates obfuscated video streaming described in FIG. 7B.

The methods and processes described in the detailed description section can be embodied as code and/or data, which can be stored in a computer-readable storage device as described above. When a computer system reads and executes the code and/or data stored on the computer-readable storage device, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method for a digital video camera in a cloud-based video monitoring system, comprising:
   detecting a triggering event;
   initiating in parallel, in response to detecting the triggering event, a local video recording in a non-volatile local storage device of the digital video camera and a streaming of a video feed of the digital video camera to a first network video recorder (NVR), wherein the local video recording corresponds to the video feed and is stored in the local storage device during the video recording, and wherein the streaming of the video feed comprises forwarding a set of packets comprising data of the video feed to the first NVR;
   detecting, by the digital video camera, a failure event that prevents the digital video camera from streaming the video feed of the digital video camera to the first NVR; and
   in response to detecting the failure event, initiating a backup operation for the streaming of the video feed.

2. The method of claim 1, wherein the failure event causes the first NVR to be unavailable to the digital video camera;
   wherein initiating the backup operation includes one or more of:
      streaming the video feed of the digital video camera to a second NVR; and
      streaming the video feed of the digital video camera to a nearby second digital video camera via a wireless link between the first and second digital cameras.

3. The method of claim 2, wherein the second digital video camera is configured to store the video feed of the digital video camera in a local non-volatile storage device in the second digital video camera.

4. The method of claim 2, wherein the first NVR is configured to operate in a local area network of the digital video camera, and the second NVR is a cloud-based NVR.

5. The method of claim 1, wherein a remote site includes a third NVR, and wherein the first and third NVRs duplicate each others' recording;
   wherein the failure event causes the first NVR to be unavailable; and
   wherein initiating the backup operation includes facilitating the duplicated video feed of the digital video camera from the third NVR.

6. The method of claim 1, wherein the failure event causes the digital video camera to be unavailable;
   wherein initiating the backup operation includes facilitating already recorded video feed of the digital video camera from one or more of: the first NVR and a nearby second digital video camera.

7. The method of claim 1, wherein the failure event causes a wired connection to the digital video camera to be unavailable;
   wherein initiating the backup operation includes one or more of:
      in response to detecting a failure to a power source of the digital video camera, using a second power source for the digital video camera and operating in a power-saving mode; and
      streaming the video feed of the digital video camera via respective wireless links to one or more of: a nearby second digital video camera and a second NVR.

8. The method of claim 1, wherein the failure event is a failure to one or more of: the first NVR, a switch and/or links between the first NVR and the digital video camera, a power source of the digital video camera.

9. The method of claim 1, wherein the method further comprises:
   identifying a first frame of the video feed recorded by the first NVR from a control message from the first NVR;

generating, from the local video recording in the local storage device, a local video segment from an initial frame of the local video recording to a frame immediately before the identified first frame;

generating, by the digital video camera, a video file comprising a last temporal segment of the video stream prior to the triggering event and the local video segment; and sending the generated video file to the first NVR.

10. The method of claim 1, further comprising storing the local video recording in the local storage device at a granularity of individual video segments of the local video recording.

* * * * *